(12) United States Patent
Kamibayashi

(10) Patent No.: US 8,994,238 B2
(45) Date of Patent: Mar. 31, 2015

(54) ENERGY CONVERSION DEVICE

(71) Applicant: Katsuyuki Kamibayashi, Osaka (JP)

(72) Inventor: Katsuyuki Kamibayashi, Osaka (JP)

(73) Assignee: Katsuyuki Kamibayashi, Osaka (JP)

( * ) Notice: Subject to any disclaimer, the term of this patent is extended or adjusted under 35 U.S.C. 154(b) by 0 days.

(21) Appl. No.: 14/240,364

(22) PCT Filed: Jun. 21, 2013

(86) PCT No.: PCT/JP2013/067070
§ 371 (c)(1),
(2) Date: Feb. 22, 2014

(87) PCT Pub. No.: WO2014/007078
PCT Pub. Date: Jan. 9, 2014

(65) Prior Publication Data
US 2014/0368095 A1    Dec. 18, 2014

(30) Foreign Application Priority Data

Jul. 3, 2012 (JP) ................................. 2012-149226

(51) Int. Cl.
| H02K 7/10 | (2006.01) |
| H02K 53/00 | (2006.01) |
| H02K 21/00 | (2006.01) |
| H02K 1/27 | (2006.01) |
| H02K 7/116 | (2006.01) |

(52) U.S. Cl.
CPC . *H02K 1/27* (2013.01); *H02K 7/116* (2013.01)
USPC ....................................... 310/152; 310/75 R

(58) Field of Classification Search
CPC ...... H02K 53/00; H02K 7/1166; H02K 7/116
USPC ................................................. 310/75 R, 152
See application file for complete search history.

(56) References Cited

U.S. PATENT DOCUMENTS

| 1,068,531 | A | * | 7/1913 | Rhodes | 310/14 |
| 4,100,441 | A | * | 7/1978 | Landry | 310/103 |
| 4,214,178 | A | * | 7/1980 | Tippner | 310/14 |
| 6,252,317 | B1 | * | 6/2001 | Scheffer et al. | 310/46 |
| 6,954,019 | B2 | * | 10/2005 | Sprain | 310/181 |
| 7,663,281 | B1 | * | 2/2010 | Nau | 310/90.5 |
| 7,884,519 | B2 | * | 2/2011 | Okuno | 310/156.38 |
| 2011/0291504 | A1 | * | 12/2011 | Niedzialkowski | 310/83 |

FOREIGN PATENT DOCUMENTS

| JP | 53-6804 | 1/1978 |
| JP | 6-2981 | 1/1994 |

(Continued)

*Primary Examiner* — Terrance Kenerly
(74) *Attorney, Agent, or Firm* — Antonelli, Terry, Stout & Kraus, LLP.

(57) ABSTRACT

[Problem] To allow for an increase in the output of an energy conversion device having a plurality of permanent magnets arranged in a ring shape. [Solution] A cover (3) is attached to a ring-shaped magnet holder (2) in which permanent magnets (1) are housed. An extended portion of the cover (3) is supported by a wheel (6). The wheel (6) is in contact with the extended portion of the cover (3) and the bottom surface of a case (5). Thereby, the magnet holder (2) can be rotated lightly even when the weight of the magnet holder (2) increases with the increase in the number of the permanent magnets (1) housed in the magnet holder (2). Thus, an energy conversion device (100) can produce more energy from the energy supplied, and thereby enhance the output.

10 Claims, 23 Drawing Sheets

(56) References Cited

FOREIGN PATENT DOCUMENTS

| | | |
|---|---|---|
| JP | 7-23547 A | 1/1995 |
| JP | 3134408 | 7/2007 |
| JP | 2007-318906 | 12/2007 |
| JP | 2009-22140 A | 1/2009 |
| JP | 2010-283983 A | 12/2010 |
| WO | 2008/032410 A1 | 3/2008 |

* cited by examiner (a)

(b)

(c)

ENERGY CONVERSION DEVICE

TECHNICAL FIELD

The present invention relates to an energy conversion apparatus that executes conversion from one to another of electrical energy and mechanical energy.

BACKGROUND ART

A generator converts mechanical energy to electrical energy. A motor converts electrical energy to mechanical energy. Loss of energy is caused during the conversion between electrical energy and mechanical energy. For improving utilization efficiency of energy given to a generator or a motor, loss caused during the conversion of energy is required to be reduced as much as possible.

For example, a generator that is configured so that a plurality of permanent magnets arranged in a ring shape penetrates a plurality of coils is proposed before now. In JP-A-2010-283983 (Patent Literature 1), for example, a generator that, although it is small and light, has high generating efficiency is disclosed. The generator disclosed in the above-described literature includes a ring in which a plurality of permanent magnets are housed, a coil that is arranged so that the permanent magnets is passed through rotation of the ring, and a roller conveyor for rotating and supporting the ring. The roller conveyor is arranged under the ring. According to the above-described configuration, since an iron core of the coil is not required, miniaturization and weight saving of the generator are realized. Further, since the ring is rotated by a small force, loss of mechanical energy is reduced. As a result, more electrical energy is taken out from the generator, and therefore generating efficiency is improved.

In JP-A-2009-22140 (Patent Literature 2), for example, a rotary generator in which a rubber roller for rotating a ring is added to the above-described configuration in which a plurality of permanent magnets arranged in a ring shape penetrate a plurality of coils is disclosed. This rubber roller is contacted with an external surface of the ring. Accordingly, the ring is held by the rubber roller and is rotated along with the rotation of the rubber roller.

A configuration that resembles that of the above-described Patent Literature 2 is disclosed, for example, in JP-A-07-23547 (Patent Literature 3) and International Publication Pamphlet No. WO2008/032410 (Patent Literature 4). That is, also in the generator disclosed in any of Patent Literatures 3 and 4, a ring for fixing a permanent magnet is contacted with a roller. The ring is held and rotated by this roller.

CITATION LIST

Patent Literature

PATENT LITERATURE 1: JP-A-2010-283983
PATENT LITERATURE 2: JP-A-2009-22140
PATENT LITERATURE 3: JP-A-07-23547
PATENT LITERATURE 4: International Publication Pamphlet No. WO 2008/032410

SUMMARY OF INVENTION

Technical Problem

In the generator having the above-described configuration, when the number of permanent magnets is increased, an output of the generator is increased. Alternatively, when a magnetic force is increased by a permanent magnet having a larger size, the output of the generator is also considered to be increased. However, there arises a problem that when the number of the permanent magnets is increased, or a size of the permanent magnet is enlarged, the weight of the ring on which the permanent magnets are mounted increases.

Any generator disclosed in each of the above-described Patent Literatures 1 to 4 also has a structure in which the ring is rotated lightly. However, also in any configuration disclosed in the literatures, when the weight of the ring increases, a roller or a rolling element is pressed down from above by the ring. Therefore, it is difficult to complete a light rotation of the ring. When the ring is not rotated lightly, loss of kinetic energy increases along with the rotation of the ring. Accordingly, the output of the generator is not increased unlike expectations.

According to the configuration of Patent Literature 1, for example, when the ring becomes heavy, since the rolling element (metallic ball) is pressed down from above by the ring, the rolling element moves slowly. To solve the above-described problem, it is considered that the rolling element is enlarged and a contact area of the rolling element to the ring is reduced. However, when the rolling element is enlarged, the generator becomes large in size. Further, since the coil is wound around the ring and the bearing, when a size of the rolling element is enlarged, a diameter of the coil becomes large. As a result, the coil moves farther away from the magnet. When the coil moves farther away from the magnet, energy (power) taken out from the generator is reduced.

Further, according to the configuration disclosed in Patent Literature 2, when the ring becomes heavy, a contact area between the ring and the rubber roller becomes large. When the contact area becomes large, a frictional force increases. Therefore, a smooth movement of the ring is prevented. Further, there arises a problem that an idea is necessary in view of a structure in which when the ring becomes heavy, it is supported by the rubber roller.

Also in the case of the configurations disclosed in Patent Literatures 3 and 4, when the weight of the ring increases, an idea is considered to be necessary in view of the structure in which the ring is supported by the roller. Further, there is a possibility that when the roller is stoutened to support the ring, it is difficult to rotate the roller smoothly.

Also in the case where the generators disclosed in Patent Literatures 1 to 4 are used as a motor, the same problem arises. That is, according to the configurations disclosed in Patent Literatures 1 to 4, when the weight of the ring increases due to an increase in the number of the permanent magnets or an increase in a size of the permanent magnet, since the ring is hard to rotate, it is difficult to increase the output of the motor. However, although Patent Literatures 1 to 4 disclose a structure in which the ring on which the permanent magnets are mounted is rotated and held, no description is specifically made about a structure that is necessary for more increasing the output of the energy conversion apparatus (the generator or the motor).

To solve the above-described problems, it is an object of the present invention to make it possible to increase the output of the energy conversion apparatus including the permanent magnets arranged in a ring shape.

Solution to Problem

An energy conversion apparatus according to an aspect of the present invention is an energy conversion apparatus that executes conversion from one to another of electrical energy and mechanical energy. The energy conversion apparatus includes a magnet ring. The magnet ring includes a ring-shaped magnet holder in which a magnet box an upper part of which is opened is formed, a permanent magnet that is housed in the magnet box of the magnet holder, a cover that is formed in a ring shape having a width wider than that of the magnet holder, and that is attached to an upper surface of the magnet holder so as to have the same center as that of the magnet holder, and that has an extension part extending in a radial direction of the magnet holder from the magnet holder, and a gear that is fixed onto the cover and the magnet holder so as to have the same center as those of the magnet holder and the cover. The energy conversion apparatus further includes a ring-shaped case that houses the magnet ring and in which a window part for exposing part of the gear to an outside is formed, a plurality of wheels that are arranged between an internal surface of the case and the magnet holder so as to be contacted with a bottom surface of the case and the extension part of the cover, a defining member through which each axis of rotation of the plurality of wheels is passed and that defines a relative distance between the plurality of wheels, and at least one coil that is wound around the case.

According to the above-described configuration, the magnet ring is supported by the plurality of wheels that are interleaved between the extension part of the cover and the bottom surface of the case. Since the weight of the magnet ring is distributed to the plurality of wheels, a force applied to one wheel is reduced. Further, each wheel is contacted through a small area with the extension part of the cover and the bottom surface of the case. Therefore, even if the weight of the magnet ring increases, the wheels are rotated lightly. That is, the magnet ring is rotated lightly. Since the magnet ring is rotated lightly, loss of energy along with the rotation of the magnet ring is reduced. Accordingly, the output of the energy conversion apparatus including the permanent magnets that are arranged in a ring shape is increased.

In the above-described configuration, the energy conversion apparatus may be an apparatus (i.e., a motor) that converts electrical energy to mechanical energy, or an apparatus (i.e., a generator) that converts mechanical energy to electrical energy.

The number of the magnet boxes that are formed in the magnet ring may be at least one, and is not particularly limited. In a similar fashion, the coil may be at least one, or plural.

Preferably, each of the plurality of wheels includes at least two circular plates that are connected through the axis of rotation.

According to the above-described configuration, not only each of the wheels is rotated lightly, but also durability of the wheels is improved. In the case where the wheel is configured by a single circular plate, a thickness of the circular plate ought to be enlarged to endure a force (load due to the weight of the ring) applied to each of the wheels. However, when the thickness of the circular plate is enlarged, a contact area of the wheel to the extension part of the cover and the bottom surface of the case becomes large. As a result, there is a possibility that the rotation of the wheels is deteriorated. According to the above-described configuration, since the force applied to each of the wheels is distributed to the plurality of circular plates, a force applied to one circular plate is reduced. The circular plate is rotated lightly and the durability of the circular plate also is improved. Accordingly, not only each of the wheels is rotated lightly but also the durability of the wheels is improved.

Preferably, the energy conversion apparatus further includes a rolling element that is arranged between the internal surface of the case and at least one of the cover and the magnet holder.

According to the above-described configuration, the magnet ring is rotated stably. A centrifugal force acts on the magnet ring along with the rotation of the magnet ring. There is a possibility that the magnet ring vibrates in a horizontal surface. By the rolling element, the magnet ring is suppressed from vibrating. Further, the rolling element assists the rotation of the magnet ring. As a result, the magnet ring is rotated stably.

Preferably, an inner radius of the gear is larger than that of the case. The rolling element is arranged between the gear and the internal surface of the case.

According to the above-described configuration, the magnet ring is rotated stably. Preferably, the energy conversion apparatus further includes a vessel that is provided over the case, and a spherical magnet that is housed in the vessel so as to be freely rotated in the vessel.

According to the above-described configuration, when repulsion and attraction between the spherical magnet and the permanent magnets that are housed in the magnet holder are used, the magnet ring is rotated more lightly.

Preferably, a cross section of the magnet holder along a radial direction of the magnet holder is approximately rectangular. A cross section of the case along a radial direction of the case is approximately rectangular. A cross section of the coil is approximately rectangular.

According to the above-described configuration, a gap between the magnet holder and the case is reduced. Accordingly, a gap between the coil that is wound around the case and the permanent magnet that is housed in the magnet holder also is reduced. When the gap between the permanent magnet and the coil is reduced, magnetic coupling between the permanent magnet and the coil is increased. Accordingly, the output of the energy conversion apparatus is increased.

Preferably, the energy conversion apparatus is a generator. The gear is engaged with a gear of a source of power.

According to the above-described configuration, the generator of a high output is realized.

Preferably, the energy conversion apparatus is a motor. The motor further includes a stator that is arranged facing the case.

According to the above-described configuration, the motor of a high output is realized.

Preferably, the stator is provided outside the case. The energy conversion apparatus further includes an added magnet ring that is provided outside the stator and that has a plurality of permanent magnets arranged in a ring shape, an added coil through which the added magnet ring is passed, and an added stator that is arranged outside the added magnet ring.

According to the above-described configuration, the energy conversion apparatus of a higher output is realized.

Preferably, the stator is provided outside the case. The energy conversion apparatus further includes an added magnet ring that is provided outside the stator and in which a gear having same number of teeth as that of the gear is formed and that includes a plurality of permanent magnets arranged in a ring shape, an added coil through which the added magnet ring is passed, and a synchronization mechanism for mutually synchronizing rotations of the magnet ring and the added magnet ring. The synchronization mechanism includes a first gear that is engaged with the gear, a second gear that is engaged with the added gear, and an axis of rotation that connects the first and second gears. The number of teeth of the first gear and the number of teeth of the second gear are equal to each other.

According to the above-described configuration, since the internal magnet ring and the external magnet ring (added magnet ring) are rotated in synchronization with each other, the stator is made common between the two magnet rings. When the two magnet rings are rotated in synchronization with each other, the output of the energy conversion apparatus is increased.

Advantageous Effects of Invention

According to the present invention, the magnet ring is supported and rotated by the plurality of wheels that are interleaved between the extension part of the cover and the bottom surface of the case. Thereby, even if the weight of the magnet ring increases, the magnet ring is rotated lightly. Accordingly, the output of the energy conversion apparatus including the permanent magnets that are arranged in a ring shape is increased.

DESCRIPTION OF EMBODIMENTS

Figure 1:
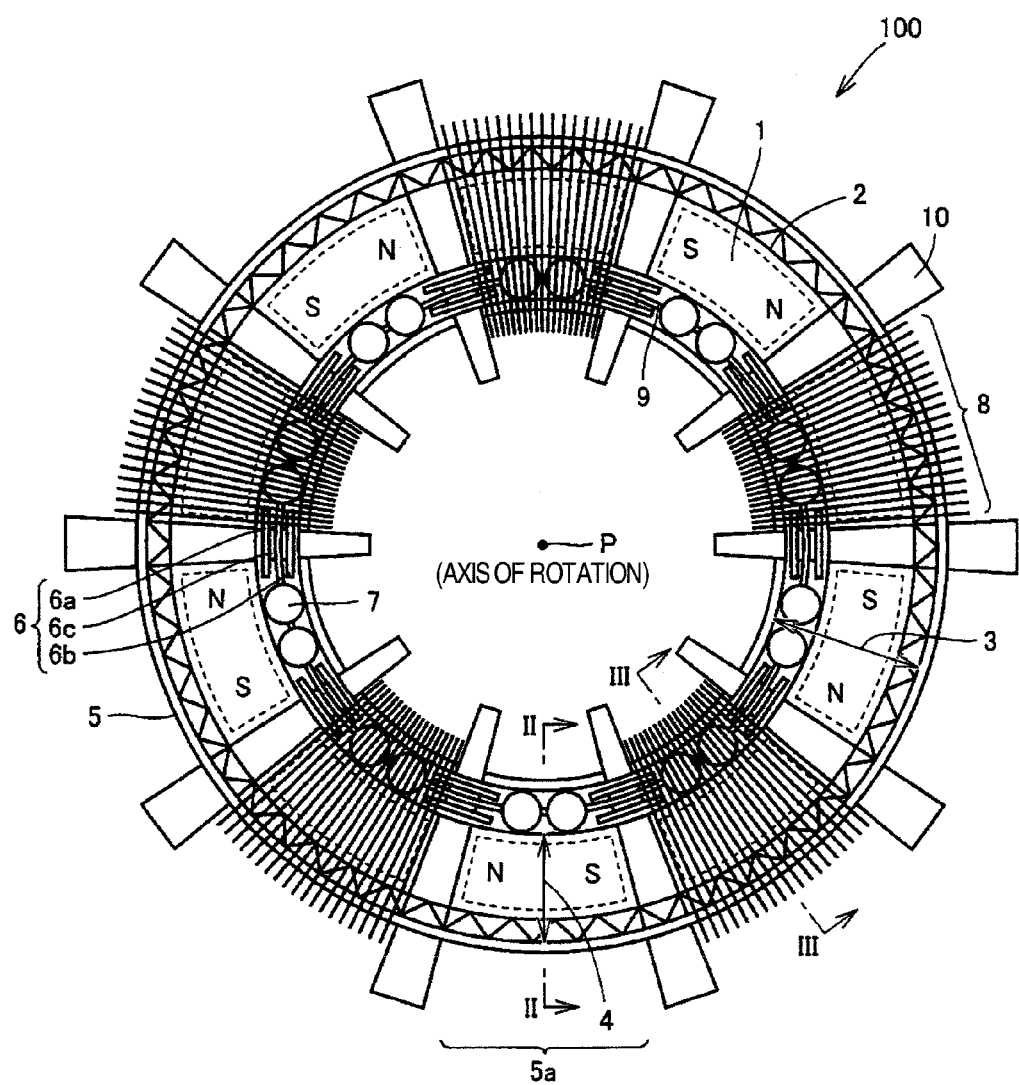
FIG. 1 is a top perspective view schematically illustrating a principal part of an energy conversion apparatus according to a first embodiment of the present invention.

Hereinafter, embodiments of the present invention will be described in detail with reference to the accompanying drawings. Note that in figures, the same components or equivalent components are indicated by the same reference numerals, and descriptions thereof will not be repeated.

First Embodiment

Figure 2:
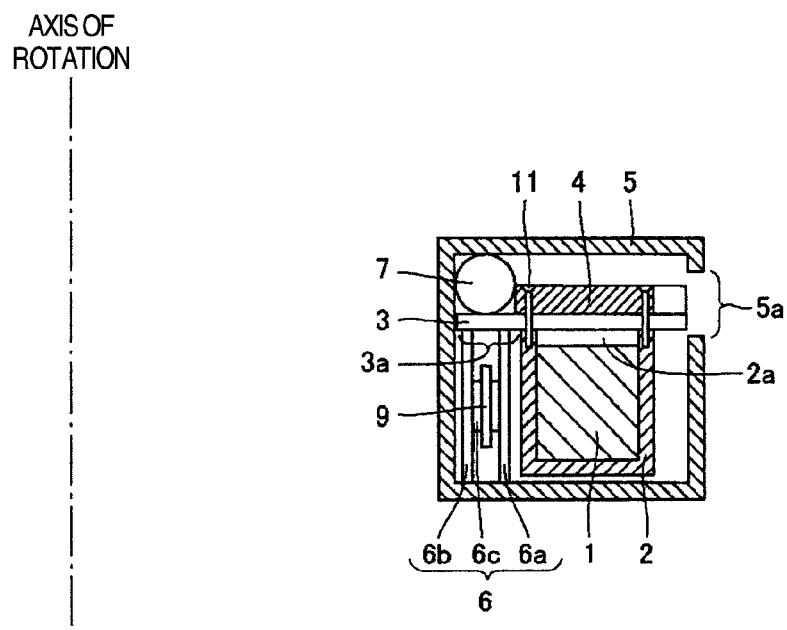
FIG. 2 is a cross-sectional view illustrating a cross section of the energy conversion apparatus along a II-II direction of FIG. 1.
Figure 3:
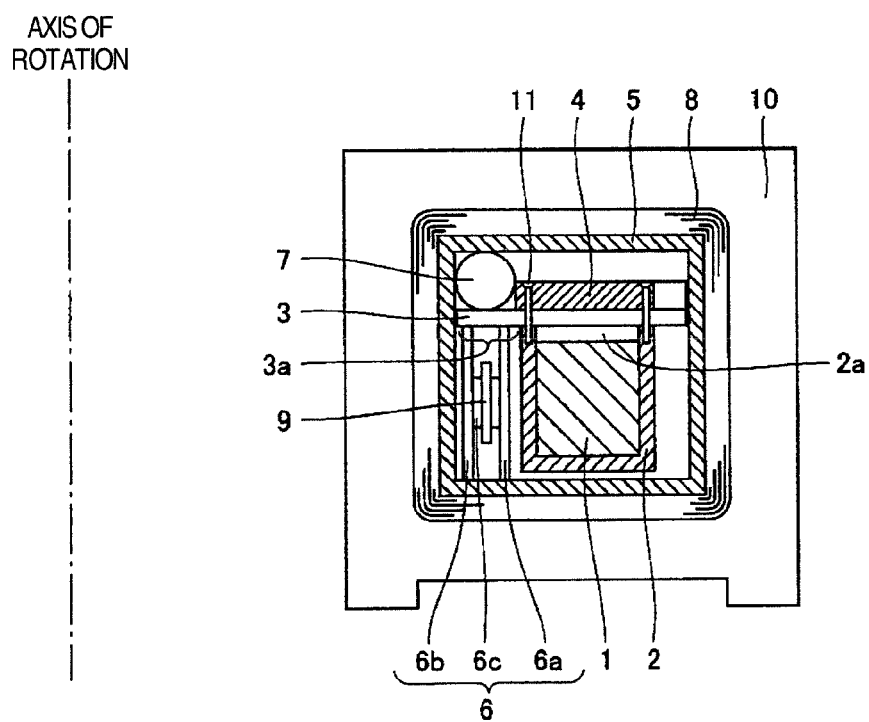
FIG. 3 is a cross-sectional view illustrating a cross section of the energy conversion apparatus along III-II of FIG. 1.

FIG. 1 is a top perspective view schematically illustrating a principal part of an energy conversion apparatus according to a first embodiment of the present invention. FIG. 2 is a cross-sectional view illustrating a cross section of the energy conversion apparatus along a II-II direction of FIG. 1. FIG. 3 is a cross-sectional view illustrating a cross section of the energy conversion apparatus along III-III of FIG. 1.

With reference to FIGS. 1 to 3, the energy conversion apparatus 100 is installed on a horizontal surface. In the present specification, a term of the "horizontal surface" means a surface that intersects with a direction of gravity. The horizontal surface is not limited to a surface that intersects with a direction of gravity strictly at an angle of 90. Note that, the energy conversion apparatus 100 is preferably installed on a surface in which an angle between the surface and the direction of gravity is near to 90 as much as possible, in view of operations of the energy conversion apparatus 100. Further, in the present specification, an up-and-down direction means a direction of gravity (vertical direction).

The energy conversion apparatus 100 includes a permanent magnet 1, a magnet holder 2, a cover 3, a gear 4, a case 5, a wheel 6, a rolling element 7, and a coil 8. A magnet ring is configured by the permanent magnet 1, the magnet holder 2, the cover 3, and the gear 4.

The permanent magnet 1 is housed in a magnet box 2a that is formed in the magnet holder 2. In FIG. 1, ten permanent magnets are illustrated so as to be housed in the magnet holder 2. Note that, this configuration is one example, and the number of the permanent magnets 1 that are housed in the magnet holder 2 may be at least one.

As the permanent magnet 1, a rare-earth magnet is preferably used. In general, a rare-earth magnet has a strong magnetic force (coersive force) as compared to a ferrite magnet having the same size. As the rare-earth magnet, for example, a samarium-cobalt magnet or a neodymium magnet is used. In the embodiment of the present invention, particularly, a neodymium magnet is preferably used.

As compared to a samarium-cobalt magnet, in general, a neodymium magnet has a strong magnetic force (coersive force) with the same size. Accordingly, for example, a small permanent magnet is used. Alternatively, as compared to a case where a samarium-cobalt magnet having the same size is used, an output of the energy conversion apparatus is increased (large energy is taken out) by using a neodymium magnet. Note that in the embodiment of the present invention, permanent magnets except a rare-earth magnet are not excluded. Of course, it is also possible to use a ferrite magnet as the permanent magnet 1.

The magnet holder 2 is formed in a ring shape, and holds the permanent magnet 1. An upper part of the magnet box 2a is opened. Accordingly, the permanent magnet 1 is inserted into the magnet box 2a from an upper part of the magnet holder 2. In the magnet holder 2, a plurality of magnet boxes are formed. When the permanent magnets 1 are inserted into the magnet boxes 2a, the permanent magnets 1 are arranged in a ring shape. The permanent magnets 1 are not limited so as to be housed in all of the magnet boxes 2a, and the permanent magnet 1 may not be housed in at least one of the plurality of magnet boxes 2a.

The magnet holder 2 is fabricated by a nonmagnetic material. In the case of nonmagnetic materials, a material of the magnet holder 2 is not particularly limited. In one embodiment, the magnet holder 2 is formed by a nonmagnetic metal (e.g., aluminum). There is a possibility that when a temperature of the permanent magnet 1 becomes excessively high, the permanent magnet 1 is degaussed. That is, a magnetic force of the permanent magnet 1 may be weakened. When the magnet holder 2 is formed by a nonmagnetic metal, heat generated in the permanent magnet 1 is efficiently diffused to the outside, and therefore a possibility that the above-described problem is caused is reduced. In another embodiment, the magnet holder 2 is formed by a resin material. When the magnet holder 2 is formed by a resin material, a weight of the magnet holder 2 is made light. In addition, an advantage that the magnet holder 2 is easy to form also is obtained.

The cover 3 is formed in a ring shape, and covers an upper surface of the magnet holder 2. The cover 3 is attached to the magnet holder 2 so as to have the same center as that of the magnet holder 2. A width of the cover 3 is formed wider than that of the magnet holder 2. Accordingly, in a state where the cover 3 is attached to the magnet holder 2, an extension part 3a is formed in the cover 3. The extension part 3a is part of the cover 3 that projects from the magnet holder 2. In the embodiment, the extension part 3a extends in an internal diameter direction of the magnet holder 2.

The gear 4 is mechanically fixed onto the cover 3 and the magnet holder 2. The gear 4 is formed in a ring shape, and arranged in the same center as that of the magnet holder 2 along with the cover 3. To fix the gear 4 and the cover 3, a screw 11 is used. The screw 11 penetrates the gear 4 and the cover 3, and is fixed onto the magnet holder 2.

An upper surface of the gear 4 is processed so that a head of the screw 11 does not project from an upper surface of the gear 4. In the gear 4, outer teeth are formed so as to be engaged with an external gear (not illustrated) of the energy conversion apparatus 100. The outer teeth of the gear 4 are directed to the outside with respect to an axis of rotation of the magnet holder 2.

In the same manner as in the cover 3, a width of the gear 4 is wider than that of the magnet holder 2. When the gear 4 is attached to the cover 3, the gear 4 extends from the magnet holder 2 in the internal diameter direction of the magnet holder 2. The width of the gear 4 is smaller than that of the cover 3. Specifically, an internal diameter of the gear 4 is larger than that of the cover 3. An external diameter of the gear 4 is approximately the same as that of the cover 3. Accordingly, a space is formed between an internal surface of the case 5 and the gear 4. The rolling element 7 is arranged in the space.

The case 5 houses the magnet ring, namely, the magnet holder 2 in which the permanent magnets are housed, the cover 3, and the gear 4. The case 5 is formed in a ring shape with a center common to that of the magnet holder 2, the cover 3, and the gear 4. A point P illustrates the common center of the magnet holder 2, the cover 3, the gear 4, and the case 5. The center illustrated by the point P corresponds to the axis of rotation illustrated in FIGS. 2 and 3. Also in figures to be hereinafter described, a relationship between the point P and the axis of rotation is the same as the above-described relationship, and therefore descriptions will not be repeated.

A window part 5a for exposing part of the gear 4 to the outside is formed in the case 5. In the window part 5a, an external gear (not illustrated) is engaged with the gear 4. When part of the gear 4 is exposed, a portion in which the window part 5a is formed is not limited. Further, the window part 5a is not limited to be formed in one portion of the case 5, but may be formed in a plurality of portions of the case 5.

The wheel 6 has circular plates 6a and 6b, and an axis of rotation 6c for connecting the circular plates 6a and 6b. The wheel 6 is arranged between the internal surface of the case 5 and the magnet holder 2. Further, the wheel 6 is contacted with a bottom of the case 5 and the extension part 3a of the cover 3. That is, the wheel 6 supports the extension part 3a of the cover 3 to thereby support the magnet holder 2 in which the permanent magnets 1 are housed. Along with the rotation of the magnet holder 2, the wheel 6 is rotated. Along with the rotation of the wheel 6, the magnet holder 2 is rotated smoothly.

For distributing the weight of the magnet ring, namely, a sum of the weight of the magnet holder 2, the cover 3, and the gear 4, the number of the wheels 6 is preferably larger. Therefore, the number of the wheels 6 is preferably two or more. Further, for stably rotating the magnet holder 2, the number of the wheels 6 is preferably three or more. Ideally, the wheels 6 are contacted with the cover 3 through points. One plain surface is defined through three points. When the number of the wheels 6 is three, the cover 3 is contacted with respective wheels 6. As a result, a surface of the cover 3 is matched with the above-described "one plain surface". Accordingly, during the rotation of the magnet holder 2, for example, the cover 3 is prevented from inclining or vibrating up and down.

The axes of rotation 6c of the respective wheels 6 are passed through the defining member 9. Thereby, relative distances between the plurality of wheels 6 are defined. Even if the cover 3 is rotated along with the rotation of the magnet holder 2, the relative distances between the plurality of wheels 6 are not changed by the defining member 9. As a result, the wheels 6 stably support the cover 3 and continue to smoothly rotate the magnet holder 2. For smoothly rotating the wheel 6 as much as possible, the defining member 9 is preferably formed so that a portion contacted with the axis of rotation 6c is small as much as possible. A specific example of the defining member 9 will be described in detail later.

In the embodiment, the magnet holder 2 is hung by the cover 3 and the wheels 6 support the cover 3. Accordingly, the cover 3 desirably has a certain level of strength. Note that a material of the cover 3 is not particularly limited, and examples include a metal and resin. Further, the wheels 6 also need to have strength capable of enduring the weight of the magnet holder 2, the cover 3, and the gear 4. Further, in the case where the magnet holder 2 is rotated at high speed, the wheels 6 also are rotated at high speed along with the rotation of the cover 3. For the purpose, the wheels 6 are preferably light as much as possible so as to be rotated at high speed. Accordingly, the wheels 6 are formed, for example, by a metal (e.g., aluminum).

The rolling element 7 is a nonmagnetic ball. The rolling element 7 is contacted with the gear 4 and the internal surface of the case 5. As a result, during the rotation of the magnet holder 2, the magnet holder 2 is prevented from vibrating in a left-and-right direction (radial direction of the magnet holder 2). The cover 3 is contacted with the wheels 6; however, a frictional force between the cover 3 and the wheels 6 is small. Accordingly, there is a possibility that during the rotation of the magnet holder 2, the cover 3 slides in the left-and-right direction through a centrifugal force. When the rolling element 7 that is contacted with the gear 4 and the internal surface of the case 5 is arranged, the cover 3 is prevented from sliding in the left-and-right direction. Therefore, the magnet holder 2 is prevented from vibrating in the left-and-right direction (radial direction of the magnet holder 2). Accordingly, the rotation of the magnet holder 2 is stabilized.

Further, a ball bearing is configured by the case 5, the rolling element 7, and the gear 4. The rotation of the rolling element 7 permits the rotation of the magnet holder 2 to be assisted. As a result, also, the rotation of the magnet holder 2 is stabilized.

In addition to the gear 4 and the internal surface of the case 5, the rolling element 7 is contacted with a top surface (surface facing the gear 4) of an internal side of the case 5. Thereby, during the rotation of the magnet holder 2, the magnet holder 2 is suppressed from vibrating not only in the left-and-right direction but also in the up-and-down direction.

Further, a cylinder (roller) may be used as the rolling element 7. In this case, the cylinder (roller) is provided so that a side surface of the cylinder (roller) is contacted with the gear 4 and the internal surface of the case 5. According to the above-described configuration, the magnet holder 2 is prevented from vibrating in the left-and-right direction (radial direction of the magnet holder 2).

The coil 8 is wound around a spool 10. The spool 10 is passed through the case 5. Accordingly, the coil 8 is wound around the case 5. The number of turns of the coil 8 and a line material thereof are not particularly limited. In addition, the spool 10 plays a role also as a supporting member for supporting the energy conversion apparatus 100 on the plain surface.

A cross section of the magnet holder 2 is rectangular. Further, a cross section of the case 5 also is rectangular. There is a possibility that in the case where a cross section of the spool is circular, a distance between the magnet holder 2 and the coil 8 becomes large. When a distance between the coil 8 and the permanent magnet 1 becomes large, a magnetic coupling force between the coil 8 and the permanent magnet 1 is reduced. However, in the embodiment, since a cross section of the spool 10 also is rectangular, the distance between the magnet holder 2 and the coil 8 is shortened as much as possible. As a result, the magnetic coupling force between the coil 8 and the permanent magnet 1 is suppressed from being reduced.

For clearly illustrating a structure of the wheel 6 in FIGS. 2 and 3, the wheel 6 is largely depicted in the left-and-right direction. However, a width in the left-and-right direction of the wheel 6 is preferably small as much as possible.

In FIG. 1, five coils 8 are illustrated. However, the number of the coils 8 may be one at a minimum, and is not particularly limited. In the case where the number of the coils 8 is plural, a plurality of the coils are preferably arranged equiangularly on a circumference defined by the case 5.

The energy conversion apparatus 100 according to the embodiment of the present invention is configured so as to execute conversion from one to another of electrical energy (power) and mechanical energy (kinetic energy). In one embodiment, the energy conversion apparatus 100 is used as a generator. In this case, an external gear that is engaged with the gear 4 is rotated by a source of power. Thus, kinetic energy for rotating the magnet holder 2 is given to the energy conversion apparatus 100. When the permanent magnets 1 that are housed in the magnet holder 2 penetrate an inner part of the coil 8, a voltage is generated at the coil 8. Accordingly, electrical energy is taken out from the energy conversion apparatus 100. That is, the energy conversion apparatus 100 converts mechanical energy into electrical energy.

In another embodiment, the energy conversion apparatus 100 is used as a motor. In this case, the magnet holder 2 functions as a rotator and the plurality of coils 8 function as a stator. When a voltage is applied to each of the plurality of coils 8, electrical energy is given to the energy conversion apparatus 100. The plurality of coils 8 are arranged at a predetermined electrical angle. A polarity of a voltage applied to each of the plurality of first coils is switched in synchronization with the electrical angle. As a result, the magnet holder 2 in which the permanent magnets 1 are housed is rotated. That is, the energy conversion apparatus 100 converts electrical energy into mechanical energy. One example of a utilization style of the energy conversion apparatus 100 will be described in detail later.

Figure 4:
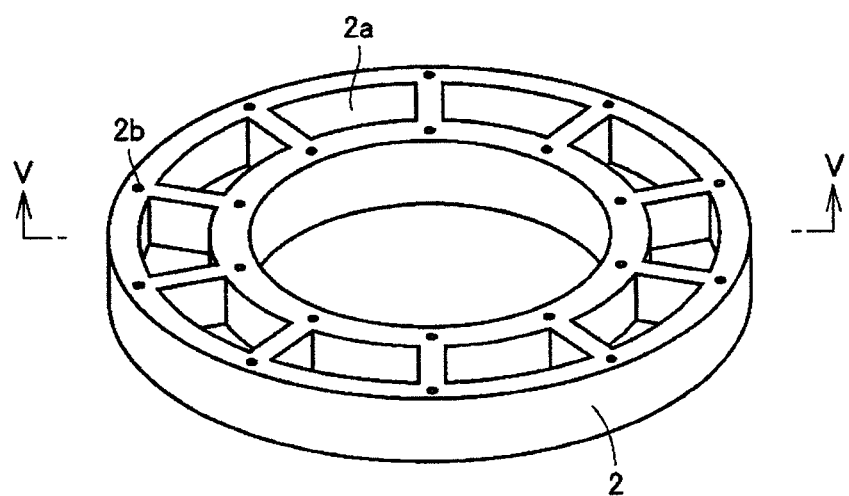
FIG. 4 is a perspective view of a magnet holder illustrated in FIGS. 1 to 3.
Figure 5:
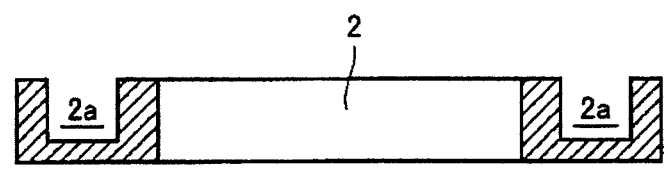
FIG. 5 is a cross-sectional view illustrating a cross section of the magnet holder along a V-V direction of FIG. 4.

FIG. 4 is a perspective view of the magnet holder 2 illustrated in FIGS. 1 to 3. FIG. 5 is a cross-sectional view illustrating a cross section of the magnet holder 2 along a V-V direction of FIG. 4. With reference to FIGS. 4 and 5, the plurality of magnet boxes 2a are formed in the magnet holder 2. An upper part of the magnet box 2a is opened. Further, screw holes 2b for fixing the screws 11 illustrated in FIGS. 2 and 3 are formed in the magnet holder 2.

Figure 6:
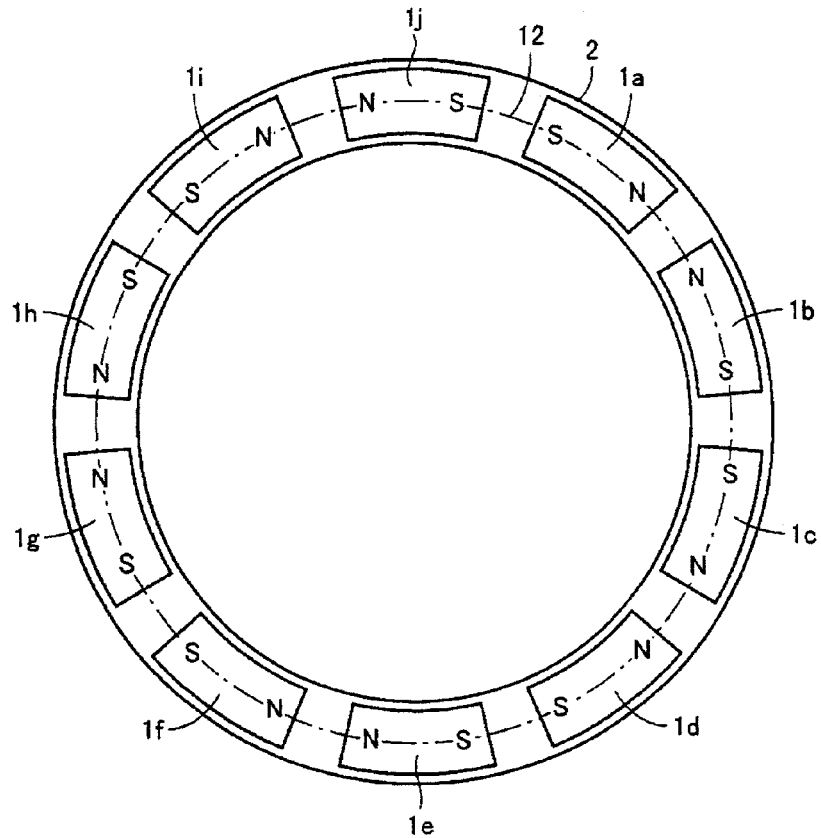
FIG. 6 is a view for describing an arrangement of permanent magnets in the magnet holder.

FIG. 6 is a view for describing an arrangement of permanent magnets in the magnet holder. With reference to FIG. 6, ten permanent magnets 1a to 1j are arranged and held along the circumference 12 in the magnet holder 2. For continuously taking out electrical energy, or for continuously rotating the magnet holder 2, two adjacent permanent magnets are arranged in the magnet holder 2 so that both of the same polarities (N pole or S pole) face each other.

From a standpoint of a function for executing conversion from one to another of mechanical energy and electrical energy, the number of the permanent magnets that are housed in the magnet holder 2 may be one at a minimum. Note that, from a standpoint of achieving a balance of the weight of the magnet holder 2, it is preferred that a plurality of permanent magnets are isotropically arranged in the magnet holder 2. As a result, since the rotation of the magnet holder 2 is stabilized, it is possible to rotate the magnet holder 2 at high speed.

Further, when the permanent magnets are arranged so that the same polarities face each other, the number of the permanent magnets that are housed in the magnet holder 2 is not limited to ten. In accordance with a performance and a size of the energy conversion apparatus 100 or an arrangement and the number of the coils 8, the number of the permanent magnets that are housed in the magnet holder 2 is appropriately determined.

Figure 7:
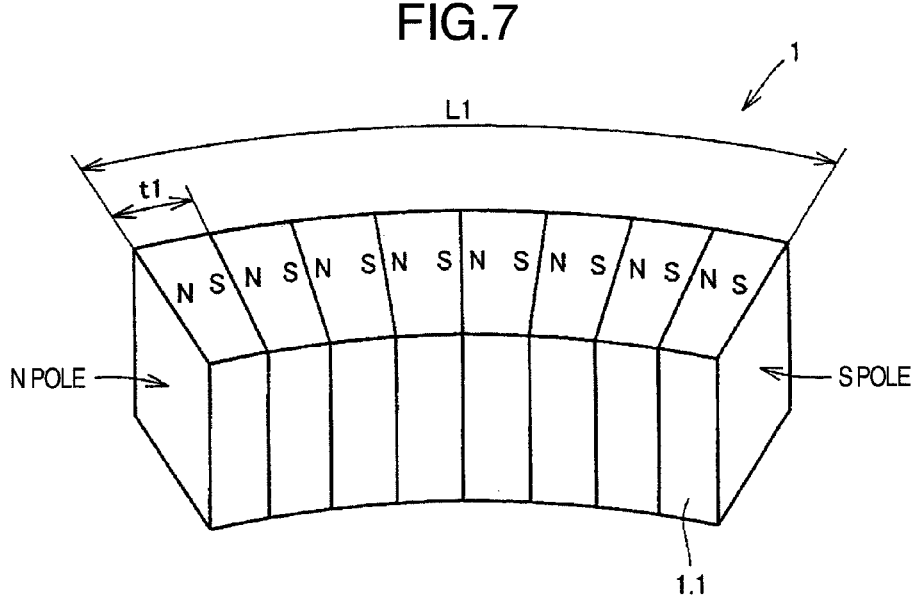
FIG. 7 is a view illustrating a first configuration example of the permanent magnets.

FIG. 7 is a view illustrating a first configuration example of the permanent magnets. With reference to FIG. 7, the permanent magnet 1 includes a plurality of magnet blocks 1.1 each of which is formed in fan-like fashion. A length (thickness of the magnet block 1.1) of an outer peripheral part of the magnet block 1.1 is t1. When an appropriate number of the magnet blocks 1.1 are arranged, a length L1 of an outer periphery of the permanent magnet 1 is approximated to a length of an outer periphery of the magnetic box 2a (see FIG. 4) as much as possible. Accordingly, a number of magnet blocks 1.1 are arranged in the magnet box 2a as much as possible. Both of two adjacent magnet blocks are arranged so that an N pole and an S pole face each other.

Figure 8:
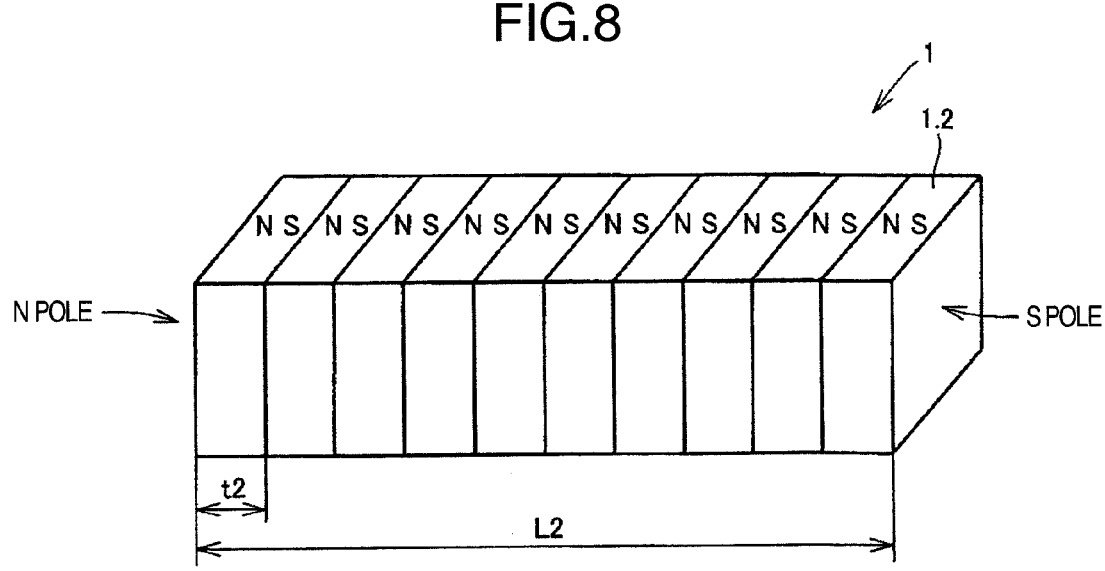
FIG. 8 is a view illustrating a second configuration example of the permanent magnets.

FIG. 8 is a view illustrating a second configuration example of the permanent magnets. With reference to FIG. 8, the permanent magnet 1 includes a plurality of magnet blocks 1.2 of rectangular parallelepiped (rectangular). A thickness of the magnet block 1.2 is t2. In the same manner as in the configuration illustrated in FIG. 7, when an appropriate number of the magnet blocks 1.1 are arranged, a length L2 of the permanent magnet 1 is approximated to a length of an inner periphery of the magnetic box 2a (see FIG. 4) as much as possible. In the same manner as in the configuration illustrated in FIG. 7, both of two adjacent magnet blocks are arranged so that an N pole and an S pole face each other.

As described above, a permanent magnet having a strong coersive force, such as a neodymium magnet, is applicable to the permanent magnet 1. However, in the case of a single magnet block, as a size thereof is larger, it is more difficult to obtain a magnetic force according to the size. In the present embodiment, when a plurality of magnet blocks are arranged in line, one permanent magnet 1 is configured. When the number of the magnet blocks is adjusted, it is possible to adjust a magnetic force. Accordingly, a magnetic force of the permanent magnet 1 is increased.

Figure 9:
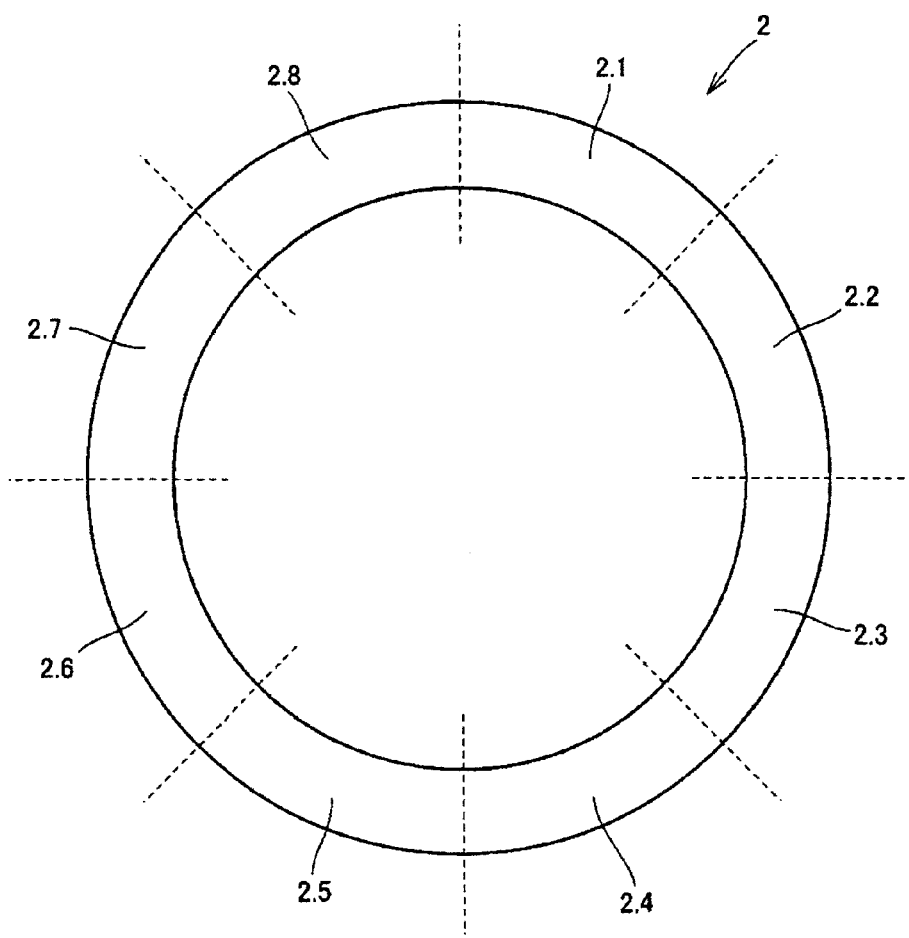
FIG. 9 is a view illustrating an example of the magnet holder that is configured so as to be disassembled.

For passing the magnet holder 2 through the plurality of coils 8, for example, the magnet holder 2 is configured so as to be disassembled. FIG. 9 is a view illustrating an example of the magnet holder 2 that is configured so as to be disassembled. With reference to FIG. 9, for example, the magnet holder 2 can be disassembled into eight parts 2.1 to 2.8. Through the joint of both the parts, the magnet holder 2 is formed.

Figure 10:
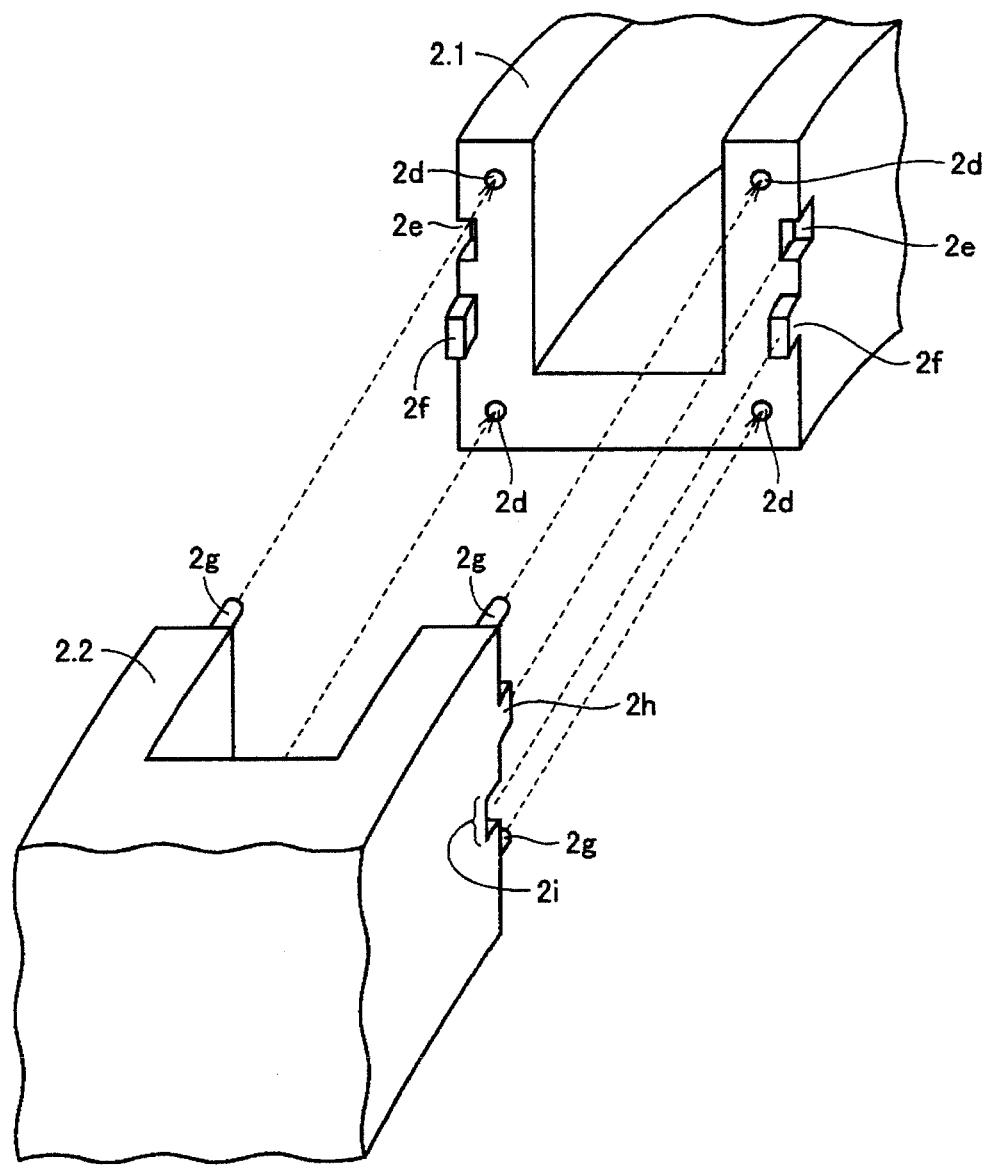
FIG. 10 is a view illustrating one example of a structure about a joint of both components of the magnet holder.

FIG. 10 is a view illustrating one example of a structure about a joint of both components of the magnet holder. With reference to FIG. 10, four pinholes 2d, two concave parts 2e, and two convex parts 2f are formed on a joint surface of the component 2.1. On the other hand, also in a joint surface side of the component 2.2, pinholes are formed in positions corresponding to the pinholes 2d and pins 2g are inserted into the pinholes. Further, in the joint surface of the component 2.2, convex parts 2h that are engaged with the concave parts 2e of the component 2.1 and convex parts 2i that are engaged with the convex parts 2f of the component 2.1 are formed. The pins 2g are inserted into the pinholes 2d, and the concave parts are engaged with the convex parts. Thereby, the component 2.1 and the component 2.2 are joined to each other. A structure of the joint of both the other components also is the same as that illustrated in FIG. 10.

In addition, the cover 3, the gear 4, and the case 5 also are formed in a ring shape. Accordingly, the cover 3, the gear 4, and the case 5 also are configured so as to be disassembled to a plurality of parts, in the same manner as in the magnet holder 2. To a configuration for joining a plurality of parts, a configuration similar to that of the magnet holder 2 is applicable.

Figure 11:
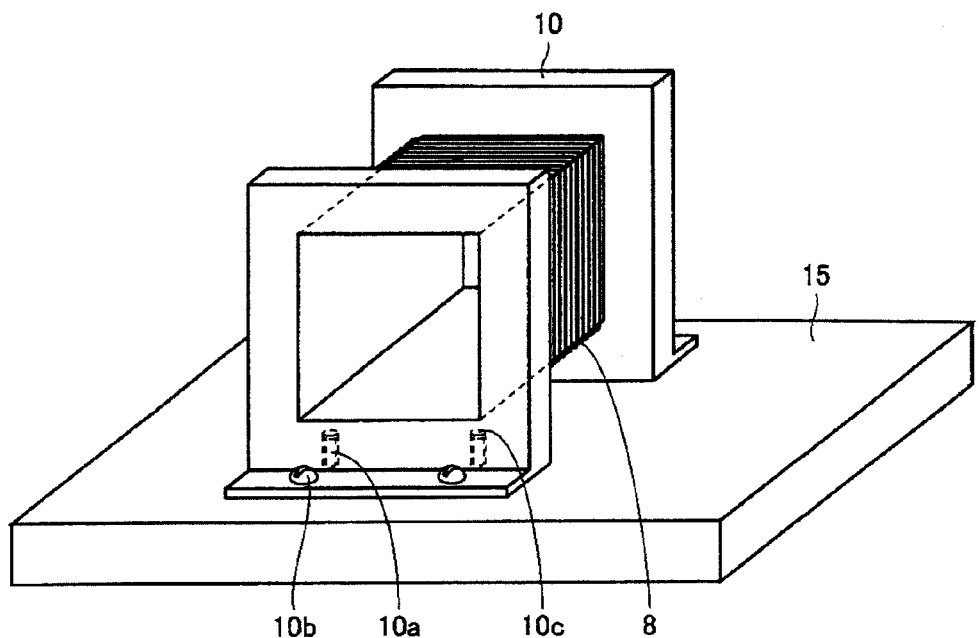
FIG. 11 is a first view illustrating a configuration about a coil.
Figure 12:
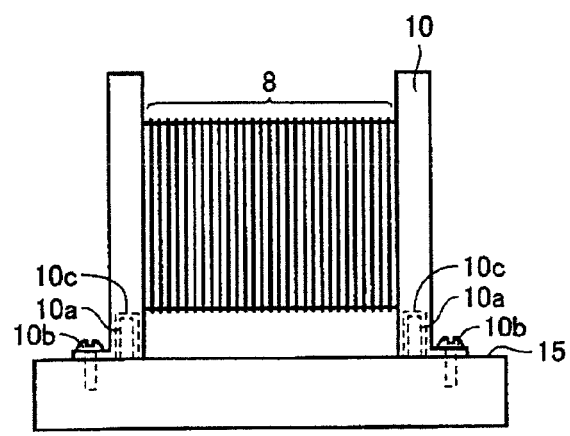
FIG. 12 is a second view illustrating a configuration about the coil.

FIG. 11 is a first view illustrating a configuration about the coil 8. FIG. 12 is a second view illustrating a configuration about the coil. With reference to FIGS. 11 and 12, the spool 10 around which the coil 8 is wound is fixed onto a base 15 by pins 10a and screws 10b. A surface of the base 15 corresponds to an installation surface of the energy conversion apparatus 100. The pins 10a are installed on the surface of the base 15.

In addition, screw holes are formed in the base 15. In a portion of the spool 10 that is contacted with the surface of the base 15, the pinholes into which the pins 10a are inserted toward an inner side of the spool 10 are formed, and through-holes for passing the screws 10b are formed. Both of pins and screws are not limited to be necessary, and the spool 10 is also fixed onto the base 15 by any one of the pins and the screws.

The spool 10 of the coil 8 may be configured, for example, so as to be divided in the up-and-down direction. In this case, the spool 10 is assembled so as to interleave the case 5, and the coil 8 is wound around the spool 10. After the coil 8 is wound around the spool 10, as illustrated in FIGS. 11 and 12, the spool 10 is installed on the base 15. Further, not only the spool 10 but also the coil 8 may be divided. In the case of this configuration, even if each of the magnet holder 2, the cover 3, the gear 4, and the case 5 is not divided into a plurality of parts, the energy conversion apparatus can be assembled.

Continuously, the configuration for supporting and rotating the magnet holder 2 will be described in detail. In the embodiment of the present invention, the cover 3 that is attached to the magnet holder 2 is supported by the plurality of wheels 6. Further, the plurality of wheels 6 are rotated along with the rotation of the magnet holder 2 (rotation of the cover 3).

Figure 13:
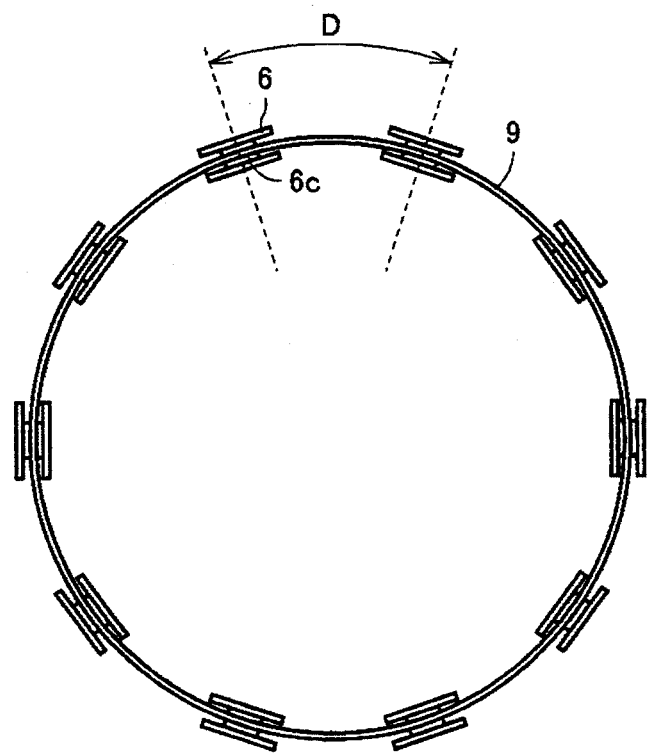
FIG. 13 is a top view illustrating an arrangement of a plurality of wheels.

FIG. 13 is a top view illustrating an arrangement of the plurality of wheels 6. With reference to FIG. 13, the axes of rotation of the plurality of wheels 6 are passed through the defining member 9. The defining member 9 is formed in an annular ring shape. Accordingly, the plurality of wheels 6 are arranged on the circumference. A relative distance (distance D illustrated in FIG. 13) between two wheels 6 is kept constant by the defining member 9. In addition, the plurality of wheels 6 are arranged equiangularly on the circumference. Accordingly, the cover 3 is stably held. Thereby, the magnet holder 2 that is attached to the cover 3 is rotated stably. When the cover 3 and the magnet holder 2 are rotated, all of the plurality of wheels 6 and the defining member 9 are rotated along the circumference determined by the defining member 9.

Figure 14:
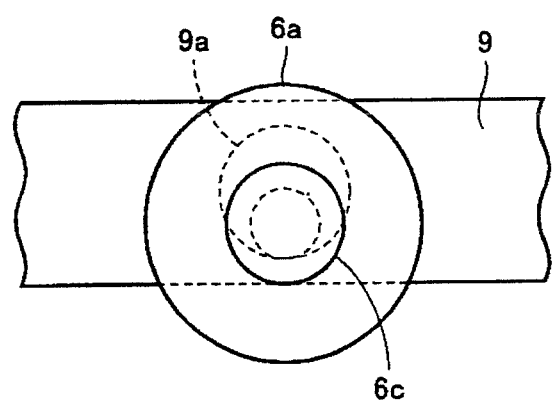
FIG. 14 is a view illustrating one example of a configuration of a defining member.
Figure 15:
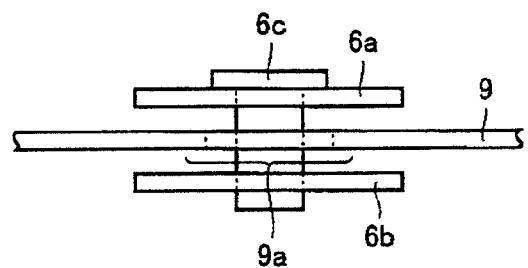
FIG. 15 is a top view of the defining member and the wheel illustrated in FIG. 14.

FIG. 14 is a view illustrating one example of a configuration of the defining member. FIG. 15 is a top view of the defining member and the wheel illustrated in FIG. 14. With reference to FIGS. 14 and 15, the axis of rotation 6c is formed as a pin for fixing the circular plates 6a and 6b. Through-holes for passing the axis of rotation 6c are formed in the circular plates 6a and 6b. Further, a through-hole 9a for passing the axis of rotation 6c (pin) is formed also in the defining member 9.

Figure 16:
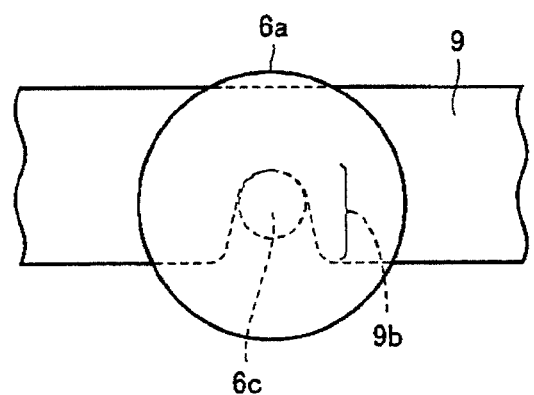
FIG. 16 is a view illustrating another example of a configuration of the defining member.

FIG. 16 is a view illustrating another example of a configuration of the defining member. With reference to FIG. 16, a notch 9b is formed in the defining member 9. The notch 9b is hooked on the axis of rotation 6c of the wheel 6. For reducing a frictional force between the axis of rotation 6c and the defining member 9 as much as possible, the through-hole 9a or the notch 9b is preferably formed so that a mutual contact part between the axis of rotation 6c and the defining member 9 is reduced as much as possible. Further, being not limited to the configurations illustrated in FIGS. 14 to 16, and various configurations are adopted in the defining member.

Figure 17:
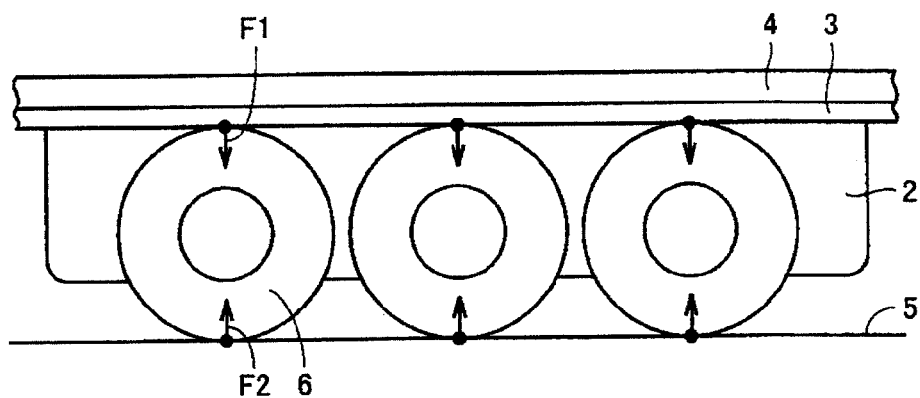
FIG. 17 is a schematic view for describing an advantage due to the wheel.

FIG. 17 is a schematic view for describing an advantage due to the wheels 6. With reference to FIG. 17, for ease of explanation, the cover 3 to which the magnet holder 2 is attached and the gear 4 that is attached to the cover 3 are supposed to be supported by three wheels 6. The permanent magnets 1 are housed in the magnet holder 2. Further, for ease of explanation, the defining member 9 is not illustrated in FIG. 17.

The whole weight of the cover 3, the gear 4, and the magnet holder 2 including the permanent magnets 1 is applied to three wheels 6. Accordingly, a force F1 (load) is applied downward to a portion in which the wheel 6 is contacted with the cover 3. On the other hand, by a reaction against the load to the wheel 6, a force F2 having the same size as that of the force F1 is applied upward to a portion in which the wheel 6 is contacted with the case 5.

The force F1 is equal to a size obtained by dividing the weight of the cover 3, the gear 4, and the magnet holder 2 including the permanent magnets 1 by the number of the wheels 6. In the embodiment of the present invention, the plurality of wheels are used. Accordingly, the force F1 applied to one wheel 6 is reduced. As the number of the wheels 6 is more increased, the force F1 is more reduced.

Figure 18:
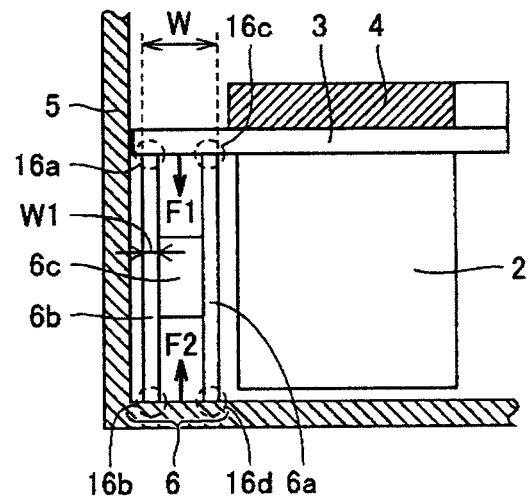
FIG. 18 is a side view of a configuration illustrated in FIG. 17.

FIG. 18 is a side view of the configuration illustrated in FIG. 17. With reference to FIG. 18, a contact part 16a is a part in which the circular plate 6a is contacted with the cover 3. A contact part 16b is a part in which the circular plate 6a is contacted with the case 5. In a similar fashion, a contact part 16c is a part in which the circular plate 6b is contacted with the cover 3, and a contact part 16d is a part in which the circular plate 6b is contacted with the case 5. A width of the wheel 6 is set to W, and widths of the circular plates 6a and 6b are set to W1.

As illustrated in FIG. 18, in the embodiment of the present invention, each of the forces F1 and F2 is distributed and applied to the two circular plates 6a and 6b. Accordingly, a force that is applied to one circular plate is further reduced. Further, the widths W1 of the contact parts 16a to 16d are small.

As described above, according to the embodiment of the present invention, since the weight of the magnet ring (the magnet holder 2, the cover 3, and the gear 4) is distributed to the plurality of wheels 6, a force applied to one of the wheels 6 is reduced. Further, each of the wheels 6 is contacted through a small area with the extension part of the cover 3 and the bottom surface of the case 5. Therefore, even if the weight of the magnet ring increases, the wheels 6 are rotated lightly. Thereby, the magnet ring is rotated lightly.

Since the magnet ring is rotated lightly, loss of energy along with the rotation of the magnet ring is reduced. Accordingly, the output of the energy conversion apparatus 100 is increased.

For increasing the magnetic coupling force between the coil (not illustrated in FIG. 18) and the permanent magnets 1 that are housed in the magnet holder 2, a distance between the both needs to be shortened as much as possible. The coil is wound around the case 5. Accordingly, for shortening a width of the wheel 6 as much as possible, the wheel 6 is considered to be configured by a single circular plate. However, in the case where the single circular plate is used as the wheel 6, a problem to be hereinafter described arises.

Figure 19:
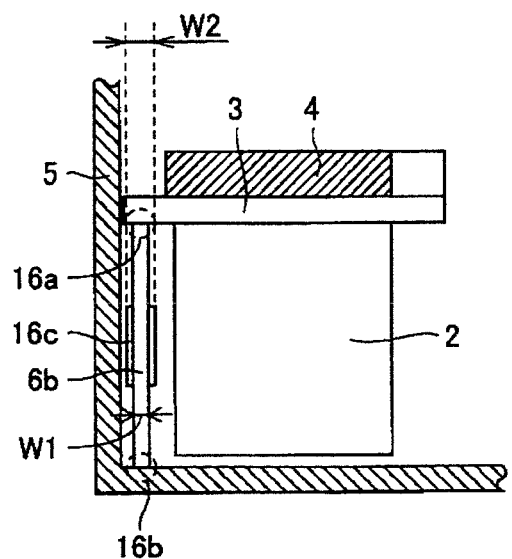
FIG. 19 is a view for describing the wheel configured by a single circular plate.

FIG. 19 is a view for describing the wheel configured by the single circular plate. With reference to FIG. 19, the width of the axis of rotation 6c is a width W2 and the width of the wheel 6 is smaller than the width W illustrated in FIG. 18. Accordingly, a distance between the permanent magnet 1 and the coil (not illustrated in FIG. 19) is shortened. However, the forces F1 and F2 are applied only to the circular plate 6b. Accordingly, the circular plate 6b is pressed by a larger force as compared to the configuration illustrated in FIG. 18. Even if the widths of the contact parts 16a and 16b are shortened, since a force applied to the circular plate 6b becomes large, the circular plate 6b is hard to rotate lightly as compared to the configuration illustrated in FIG. 18. Further, there arises a problem of durability of the circular plate 6b since the force applied to the circular plate 6b is large. For improving the durability of the circular plate 6a, the width of the circular plate 6b is considered to be enlarged. However, there is a possibility that since the widths of the contact parts 16a and 16b become large, the rotation of the wheels is deteriorated.

In the embodiment of the present invention, the wheel 6 is configured by a plurality of circular plates. As a result, since a force applied to each wheel is distributed to the plurality of circular plates, a force applied to one circular plate is reduced. Further, an area of a part in which the one circular plate is contacted with the cover 3 and the bottom surface of the case 5 is small. Accordingly, the wheels 6 are rotated lightly. Further, durability of the circular plates configuring the wheel 6 also is improved. When the wheels 6 are rotated lightly, loss of energy is reduced. Accordingly, the output of the energy conversion apparatus is increased.

When the number of the circular plates per wheel is increased, a force applied to one circular plate is reduced; however, the width of the wheel becomes large. Accordingly, in the embodiment, the wheel 6 is configured by the two circular plates 6a and 6b. Note that in the case where an acceptable width of the wheel 6 has a margin, the number of the circular plates may be more than two.

Figure 20:
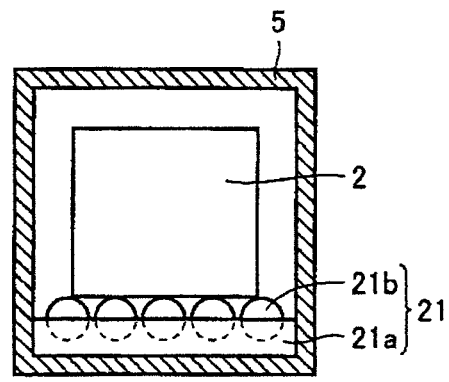
FIG. 20 is a view illustrating a configuration of a first comparative example.

Features of the above-described configuration will be described in more detail as compared to the other configurations. FIG. 20 is a view illustrating a configuration of a first comparative example. This configuration is essentially the same as that disclosed in Patent Literature 1 (JP-A-2010-283983). With reference to FIG. 20, bearings 21 are installed on the bottom surface of the case 5. The magnet holder 2 is mounted on the bearings 21, and thereby supported.

The bearing 21 includes a supporter 21a and balls 21b. When the magnet holder 2 is rotated, the balls 21b are rotated. Thereby, the magnet holder 2 is rotated lightly. However, the bottom surface of the magnet holder 2 is contacted with the balls 21b that are embedded under the magnet holder 2. Since the number of the balls that are contacted with the magnet holder 2 increases, the sum of the contact areas becomes large.

Further, when the number of the permanent magnets 1 that are housed in the magnet holder 2 is increased, the weight of the magnet holder 2 increases. When the weight of the magnet holder 2 increases, the balls 21b are pressed down by the magnet holder 2. Friction between the bottom surface of the magnet holder 2 and the balls 21b increases due to a reason of surface roughness of the magnet holder 2. Accordingly, when the weight of the magnet holder 2 increases, the balls 21b are hard to rotate and the magnet holder is rotated slowly.

To solve the above-described problem, when the balls 21b are enlarged, the contact area between the magnet holder 2 and the balls 21b is considered to be reduced. However, when the balls 21b are enlarged, since both of the magnet holder 2 and the bearings 21 are housed in the case 5, a cross-sectional area (an internal space of the case 5) of the case 5 ought to be enlarged. However, a cross-sectional area of the magnet holder 2 is not changed. Therefore, a distance between the coil wound around the case 5 and the permanent magnet in the magnet holder 2 becomes large. When the distance between the coil and the permanent magnet becomes large, since the magnetic coupling force is reduced, the output of the energy conversion apparatus is hard to increase.

To cope with the above, according to the embodiment of the present invention, the cover 3 that is attached to the magnet holder 2 is supported by vertically oriented wheels 6. The "vertical orientation" means a state where the circular plates 6a and 6b are oriented vertically so that the axis of rotation is in the horizontal direction. As compared to the configuration of FIG. 20, since the wheel 6 is contacted with only a small part of the cover 3, the contact area is small. Accordingly, the magnet holder 2 is rotated lightly. Further, a diameter of the wheel 6 is approximately the same level as a height of the magnet holder 2. Accordingly, the need to particularly widen an internal space of the case 5 is eliminated. As a result, a distance between the coil and the permanent magnets that are housed in the magnet holder 2 is shortened.

Figure 21:
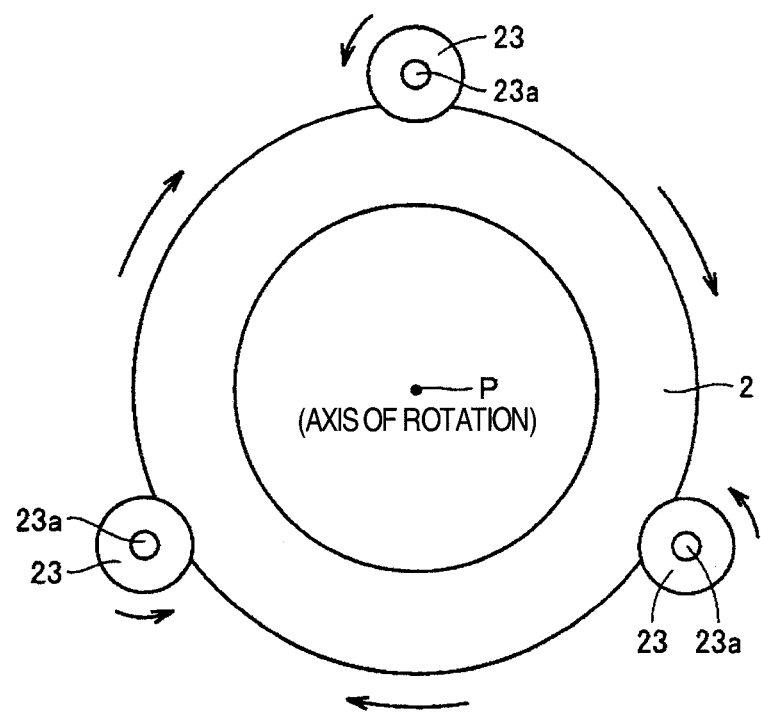
FIG. 21 is a top view illustrating a configuration of a second comparative example.
Figure 22:
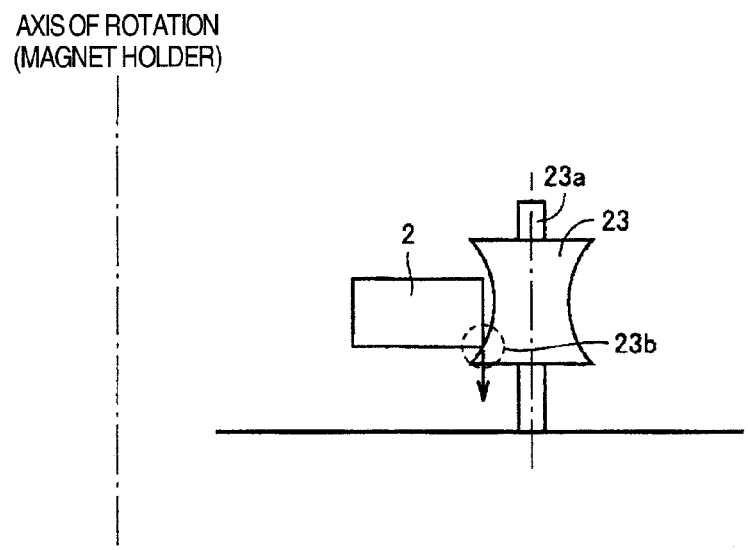
FIG. 22 is an elevation view illustrating part of the comparative example illustrated in FIG. 21.

FIG. 21 is a top view illustrating a configuration of a second comparative example. FIG. 22 is an elevation view illustrating part of the comparative example illustrated in FIG. 21. The configurations illustrated in the figures schematically illustrate configurations of feature parts disclosed in Patent Literature 2 (JP-A-2009-22140), Patent Literature 3 (JP-A-07-23547), and Patent Literature 4 (International Publication Pamphlet No. WO2008/032410). With reference to FIGS. 21 and 22, the magnet holder 2 is supported by the roller 23. Further, the roller 23 assists the rotation of the magnet holder 2. As illustrated in FIG. 22, the axis of rotation 23a of the roller 23 extends in the up-and-down direction. In other words, the roller 23 is oriented horizontally. The configuration illustrated in FIGS. 21 and 22 essentially differs from the configuration according to the embodiment of the present invention in the above-described point.

When the number of the permanent magnets 1 that are housed in the magnet holder 2 is increased, the weight of the magnet holder 2 increases. In the configuration of Patent Literature 2, for example, a rubber roller is used. Accordingly, when the weight of the magnet holder 2 increases, an area of a part (contact part 23b) that is contacted with the magnet holder 2 becomes large in a surface of the roller 23. Thereby, since a frictional force increases, the magnet holder 2 is rotated slowly. Further, a possibility is considered that, for example, the axis of rotation 23a of the roller 23 is inclined from the up-and-down direction due to the weight of the magnet holder 2. Also in the case where the roller 23 is distorted as described above, the roller 23 is hard to rotate. As a result, the magnet holder 2 is rotated slowly.

To cope with the above-described problem, according to the embodiment of the present invention, the cover 3 that is attached to the magnet holder 2 is supported by the vertically oriented wheels 6. There is no problem that since a force is applied to the axis of rotation of the wheel in the up-and-down direction, the axis of rotation of the wheel is inclined. Accordingly, the magnet holder 2 is rotated lightly as compared to the configuration of FIGS. 21 and 22.

Further, according to the embodiment of the present invention, a cross-sectional shape of the case 5 is approximately rectangular. The cross-sectional shape means a shape of a cross section in a radial direction of the ring. Thereby, a cross-sectional shape of the spool 10 also is allowed to be approximately rectangular. In a similar fashion, a cross-sectional shape of the magnet holder 2 also is approximately rectangular.

Figure 23:
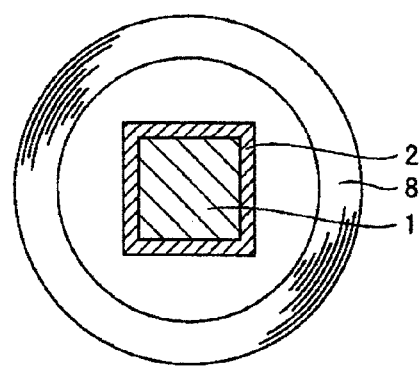
FIG. 23 is a view for describing a cross section of a general coil.

FIG. 23 is a view for describing a cross section of a general coil. With reference to FIG. 23, a cross section of the coil 8 is circular. In the coil 8, the magnet holder 2 in which the permanent magnets 1 are housed is arranged. However, in the coil 8, a wasteful space increases and a distance between the permanent magnet 1 and the coil 8 becomes large. As a result, the magnetic coupling force between the permanent magnet 1 and the coil 8 is reduced.

Figure 24:
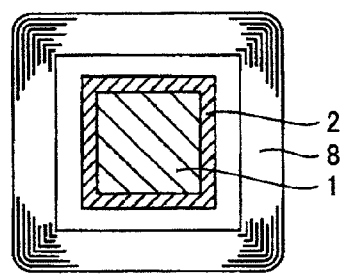
FIG. 24 is a cross-sectional view schematically illustrating an arrangement relationship between the magnet holder and the coil according to the embodiment of the present invention.

FIG. 24 is a cross-sectional view schematically illustrating an arrangement relationship between the magnet holder and the coil according to the embodiment of the present invention. With reference to FIG. 24, the cross section of the coil 8 is rectangular. That is, the coil 8 is wound around the magnet holder 2 along a cross-sectional shape of the magnet holder 2. Thereby, since a distance between the permanent magnet 1 and the coil 8 is shortened, the magnetic coupling force between the permanent magnet 1 and the coil 8 is increased as compared to the configuration illustrated in FIG. 23. As a result, the output of the energy conversion apparatus 100 is increased.

As described above, according to the first embodiment of the present invention, the cover 3 is attached to the ring-shaped magnet holder 2 in which the permanent magnets 1 are housed. The extension part 3a of the cover 3 is supported by the wheel 6. The wheel 6 is oriented vertically and contacted with the extension part 3a of the cover 3 and the bottom surface of the case 5. Thereby, when the number of the permanent magnets 1 that are housed in the magnet holder 2 increases, even if the weight of the magnet holder 2 increases, the magnet holder 2 is rotated lightly. That is, the loss of energy (loss of kinetic energy) is reduced along with the rotation of the magnet holder 2. Accordingly, according to the first embodiment, the energy conversion apparatus 100 takes out more energy from given energy. That is, according to the first embodiment, the output of the energy conversion apparatus is increased.

Second Embodiment

Figure 25:
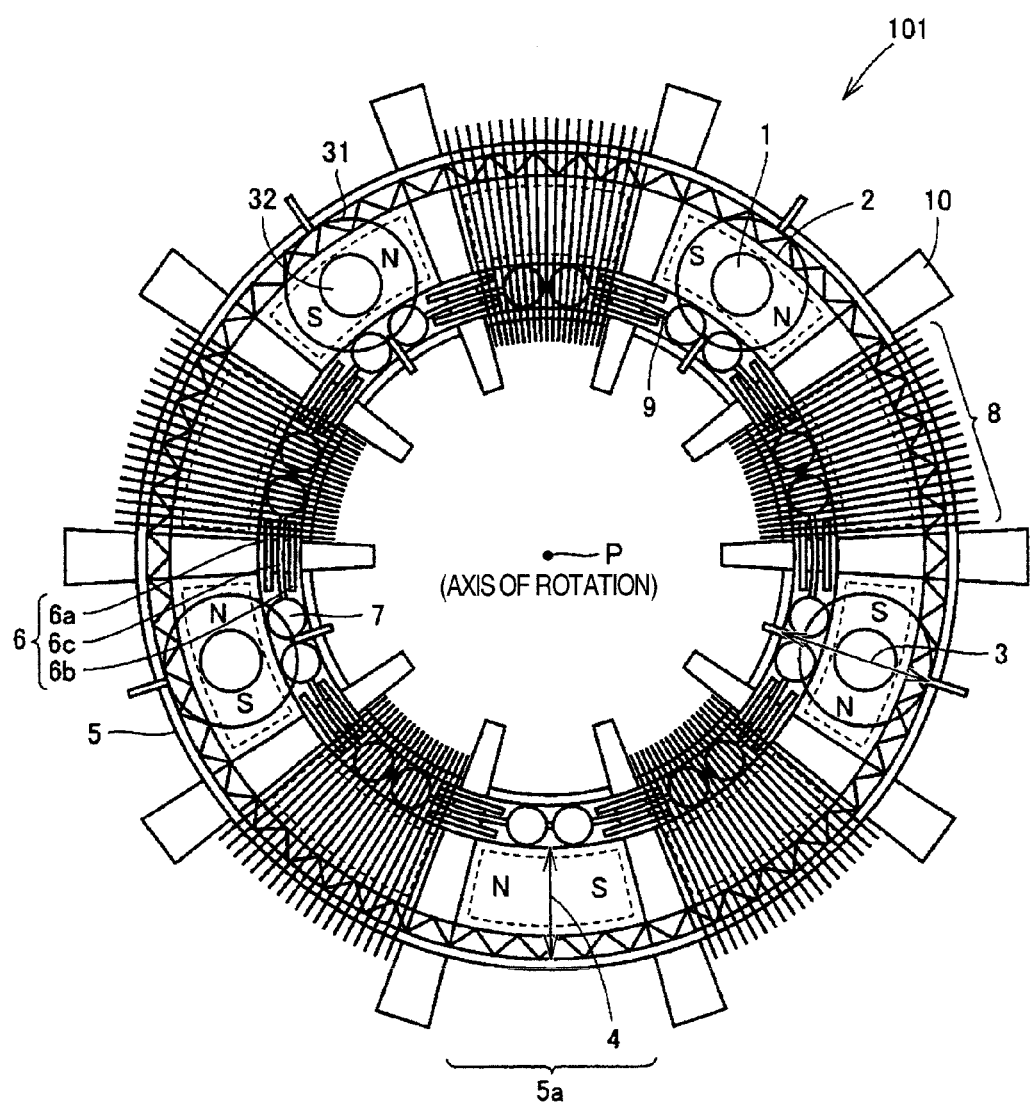
FIG. 25 is a top perspective view schematically illustrating a principal part of an energy conversion apparatus according to a second embodiment of the present invention.

FIG. 25 is a top perspective view schematically illustrating a principal part of an energy conversion apparatus according to a second embodiment of the present invention. With reference to FIGS. 1 and 25, the energy conversion apparatus 101 according to the second embodiment differs from the energy conversion apparatus 100 according to the first embodiment in that the energy conversion apparatus 101 further includes vessels 31 provided over the magnet holder 2 and spherical magnets 32 that are housed in the vessels 31 so as to be freely rotated. Configurations of the other components of the energy conversion apparatus 101 are the same as those of the components corresponding to the energy conversion apparatus 100 illustrated in FIG. 1, and therefore descriptions will not be repeated subsequently.

The vessel 31 is arranged between two coils 8. The vessel 31 is supported, for example, by a supporting member that is installed so as to stride over the case 5. In this case, an arrangement of the vessel 31 is determined so that the supporting member does not interfere with the window part 5a of the case 5. Note that a method and a unit for fixing the vessel 31 are not particularly limited.

The spherical magnets 32 are permanent magnets. The spherical magnets 32 play a role in assisting the rotation of the permanent magnets 1 that are housed in the magnet holder 2. When the spherical magnets 32 are permanent magnets, a type thereof is not particularly limited. Further, a size of the spherical magnet 32 also is appropriately determined.

Figure 26:
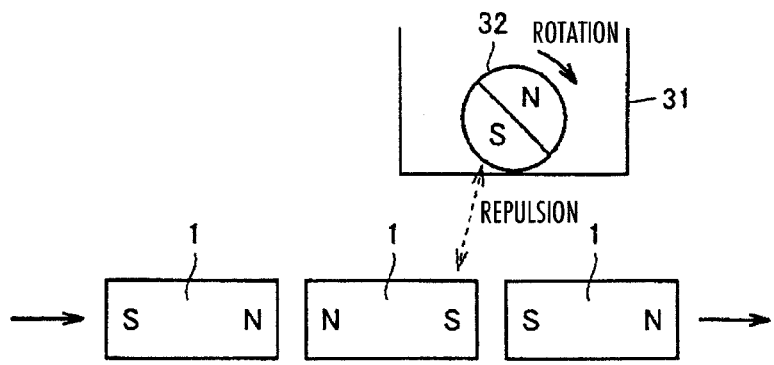
FIG. 26 is a view for describing an assistance of rotation of the permanent magnet through a spherical magnet.
Figure 26:
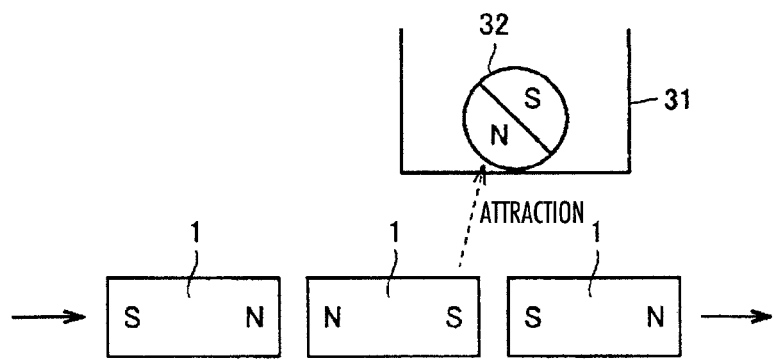
Figure 26:
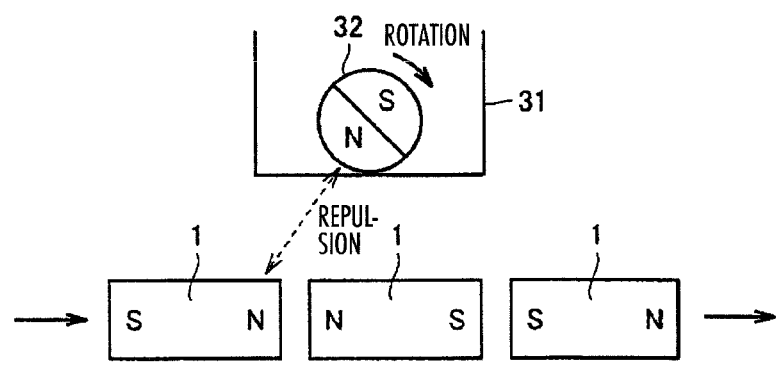

FIG. 26 is a view for describing an assistance of the rotation of the permanent magnet through the spherical magnet. FIG. 26A illustrates a first stage of the rotation of the permanent magnet. FIG. 26B illustrates a second stage of the rotation of the permanent magnet. FIG. 26C illustrates a third stage of the rotation of the permanent magnet. As a matter of convenience of illustration, in FIG. 26, the plurality of permanent magnets 1 are illustrated so as to move linearly from left to right on paper.

First, as illustrated in FIG. 26A, in the first step, an S pole of the spherical magnet 32 is supposed to be directed downward. During the movement of the plurality of permanent magnets 1, an S pole of a certain permanent magnet comes close to the S pole of the spherical magnet 32. Accordingly, the permanent magnet repels the spherical magnet 32. Since the permanent magnet 1 is held in the magnet holder 2, the spherical magnet 32 receives an influence of the repulsion. Accordingly, the spherical magnet 32 is rotated. Through the rotation of the spherical magnet 32, an N pole of the spherical magnet 32 is directed downward.

Next, as illustrated in FIG. 26B, in the second step, attraction occurs between the S pole of the permanent magnet and the N pole of the spherical magnet 32. Through a component part in an advancing direction of the plurality of permanent magnets 1 in this attraction, the rotation of the plurality of permanent magnets 1 is assisted.

Continuously, as illustrated in FIG. 26C, in the third step, the N pole of the above-described permanent magnet or the next permanent magnet comes close to the N pole of the spherical magnet 32. Thereby, the repulsion occurs again and the spherical magnet 32 is rotated again. The rotation of the spherical magnet 32 permits the S pole of the spherical magnet 32 to be directed downward. Since the attraction occurs between the N pole of the permanent magnet and the S pole of the spherical magnet 32, a component part in the advancing direction of the plurality of permanent magnets 1 is caused. Subsequently, states illustrated in FIGS. 26A to 26C are repeated.

To make descriptions understandable, in FIG. 26, the permanent magnets 1 that are housed in the magnet boxes 2a of the magnet holder 2 are illustrated. As described above, the permanent magnet 1 is configured by a plurality of magnet blocks (see FIGS. 7 and 8). An advantage exerted between each of the plurality of magnet blocks and the spherical magnet 32 is the same as that illustrated in FIG. 26.

As described above, according to the second embodiment, the magnet holder 2 in which the permanent magnets are housed is rotated more lightly by the spherical magnet.

<Modification Example of Configuration of Energy Conversion Apparatus>

The configuration of the energy conversion apparatus according to the embodiment of the present invention is not limited to the above-described configuration. Hereinafter, modification examples of the above-described configuration for rotating the magnet holder 2 lightly will be described. Further, the following modification examples can be appropriately combined with the above-described configuration.

Figure 27:
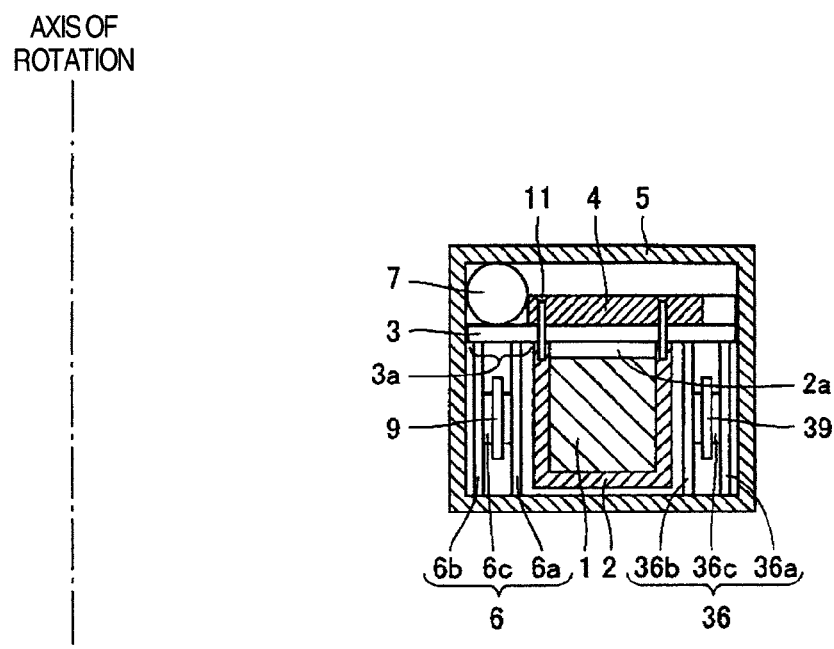
FIG. 27 is a view illustrating a first modification example of the energy conversion apparatus according to the embodiment of the present invention.

FIG. 27 is a view illustrating a first modification example of the energy conversion apparatus according to the embodiment of the present invention. With reference to FIG. 27, in the case 5, a wheel 36 is provided in addition to the wheel 6. The wheel 36 has the same configuration as that of the wheel 6, and includes circular plates 36a and 36b, and an axis of rotation 36c connecting the circular plates 36a and 36b. Further, the wheel 36 also is preferably provided in plurality in the same manner as in the wheels 6. Therefore, defining members 39 for defining a relative distance between a plurality of the wheels 36 are provided. The axis of rotation 36c of the wheel 36 is passed through the defining member 39. About a configuration of the defining member 39, the same configuration as that of the defining member 9 illustrated in FIGS. 14 to 16 is adopted.

The wheel 36 is located on the opposite side of the wheel 6 with respect to the magnet holder 2, namely, at the outside of the magnet holder 2. In the configuration illustrated in FIG. 27, an extension part 3b that extends to the outside of the magnet holder 2 along a radial direction of the cover 3 is formed in the cover 3. The wheel 36 is contacted with the extension part 3b of the cover 3 and the bottom surface of the case 5.

According to the above-described configuration, the cover 3 to which the magnet holder 2 is attached is supported by the plurality of wheels 6 and the plurality of wheels 36. Thereby, all the weight of the magnet holder 2, the cover 3, and the gear 4 is distributed to more wheels. Accordingly, since a force applied to one wheel is more reduced, the wheels are rotated lightly. Accordingly, the magnet holder 2 is rotated lightly. Since the magnet holder 2 is rotated lightly, for example, the number of the permanent magnets that are housed in the magnet holder 2 is also increased. As a result, the output of the energy conversion apparatus is more increased.

Figure 28:
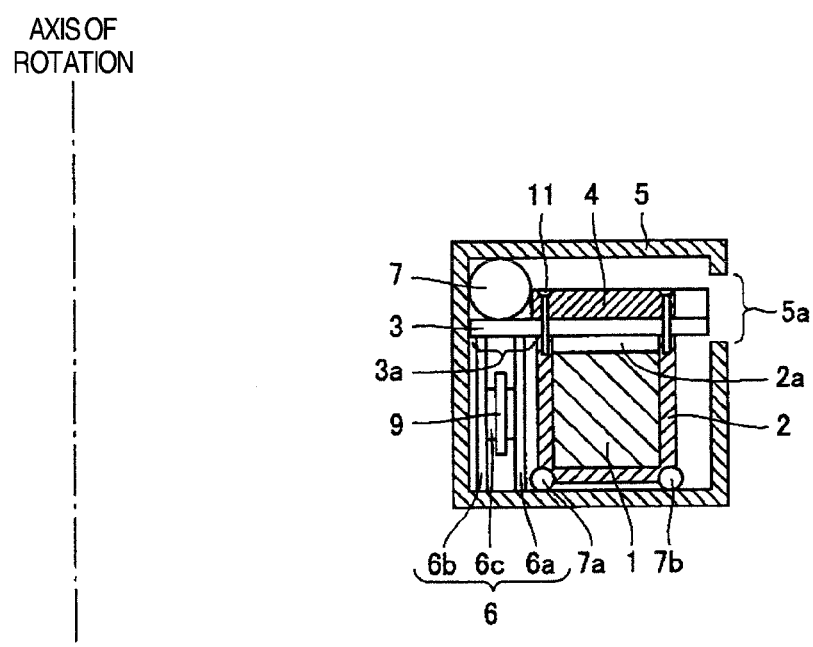
FIG. 28 is a view illustrating a second modification example of the energy conversion apparatus according to the embodiment of the present invention.

FIG. 28 is a view illustrating a second modification example of the energy conversion apparatus according to the embodiment of the present invention. With reference to FIG. 28, the bottom part of the magnet holder 2 is processed so as to be contacted with the rolling elements 7a and 7b. The rolling elements 7a and 7b are arranged on the bottom surface of the case 5, and assist the rotation of the magnet holder 2.

Like the above, in the case where the wheel 6 is not provided, all the weight of the magnet holder 2, the cover 3, and the gear 4 is applied to the rolling elements 7a and 7b. Therefore, there is a possibility that when the weight of the magnet holder 2 increases, the magnet holder 2 is rotated slowly. However, in the embodiment of the present invention, the cover 3 to which the magnet holder 2 is attached is supported by the wheel 6. Accordingly, a force applied to the rolling elements 7a and 7b is small. Note that the rolling elements need not be limited to be arranged on both of two parts of the bottom part of the magnet holder 2. The rolling element may be provided on only any one of the two parts of the bottom part of the magnet holder 2 illustrated in FIG. 28.

Figure 29:
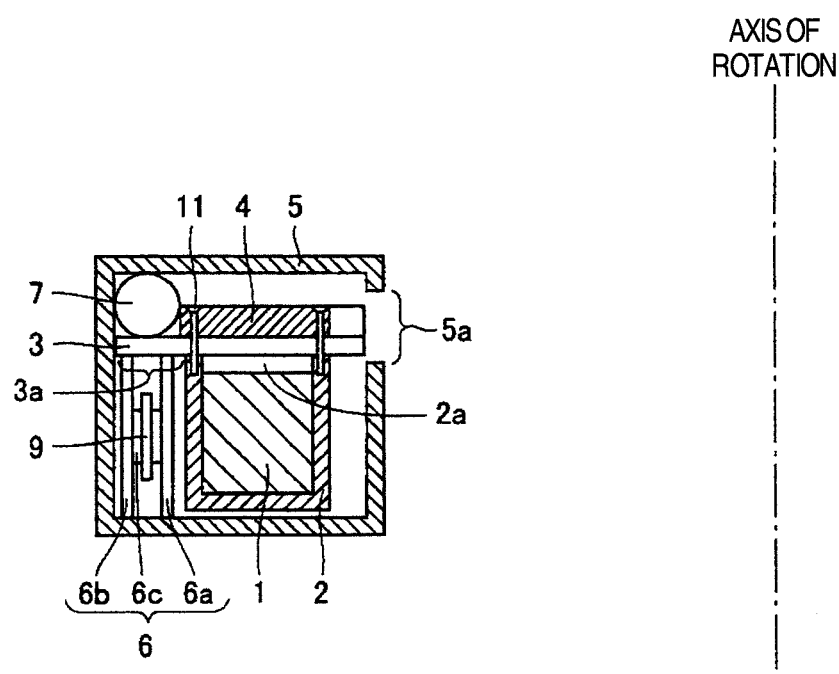
FIG. 29 is a view illustrating a third modification example of the energy conversion apparatus according to the embodiment of the present invention.

FIG. 29 is a view illustrating a third modification example of the energy conversion apparatus according to the embodiment of the present invention. With reference to FIG. 29, the teeth of the gear 4 are directed to the axis of rotation side of the magnet holder 2. Accordingly, the window part 5a of the case 5 is formed so as to be directed to the axis of rotation side of the magnet holder 2. As described above, the teeth of the gear 4 may be directed to any side of the outer diameter side and the inner diameter side of the case 5.

APPLICATION EXAMPLE

Figure 30:
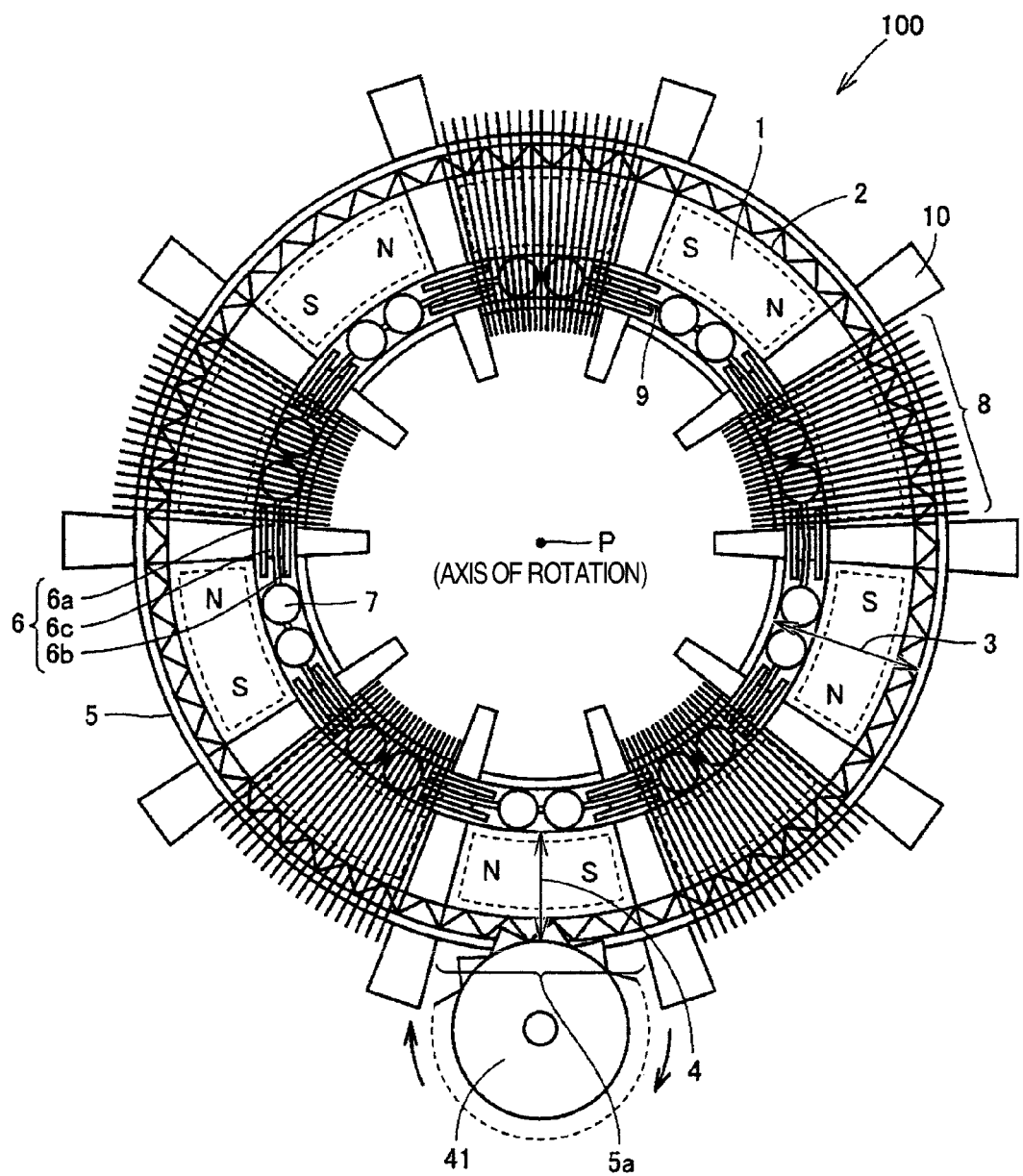
FIG. 30 is a view illustrating one example in which the energy conversion apparatus according to the embodiment of the present invention is used as a generator.
Figure 31:
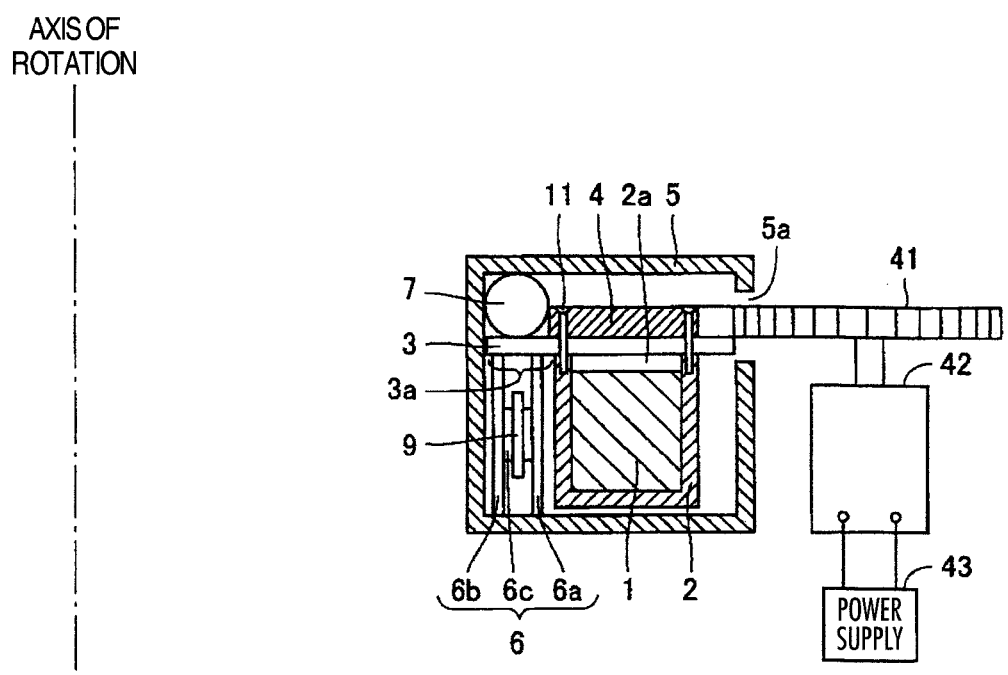
FIG. 31 is a side view for schematically describing a configuration illustrated in FIG. 30.

FIG. 30 is a view illustrating one example in which the energy conversion apparatus according to the embodiment of the present invention is used as a generator. FIG. 31 is a side view for schematically describing the configuration illustrated in FIG. 30.

With reference to FIGS. 30 and 31, the gear 4 is engaged with an external gear 41. The gear 41 is connected to an axis of rotation of a motor 42 as a source of power. Power is supplied to the motor 42 from a power supply 43 to thereby rotate the gear 41. Thereby, the gear 4 of the energy conversion apparatus 100 is rotated. That is, mechanical energy is given to the energy conversion apparatus 100. Since the magnet holder 2 is rotated through the rotation of the gear 4, the permanent magnets 1 pass through the coils 8. As a result, power is taken out from the coils 8.

Application of the generator and application of power taken out from the coils 8 are not particularly limited. Further, in FIG. 31, the motor 42 is illustrated as the source of power for rotating the gear 41. However, the source of power for rotating the gear 41, namely, a supply source of mechanical energy is not particularly limited. For example, an internal combustion (engine) can be used as a source of power. Further, the gear 41 may be rotated, for example, by a rolling mechanism using man power.

Figure 32:
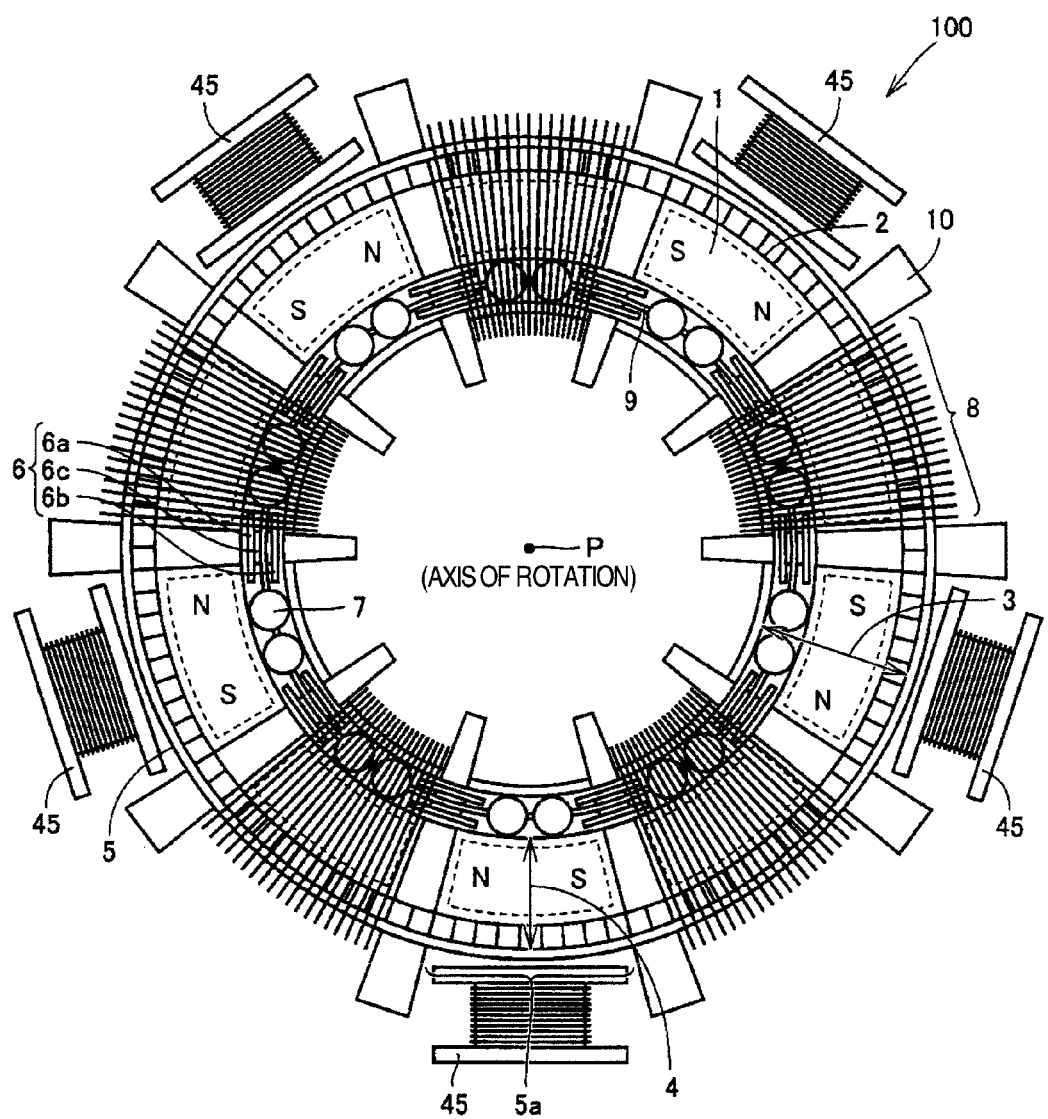
FIG. 32 is a view illustrating one example in which the energy conversion apparatus according to the embodiment of the present invention is used as a motor.
Figure 33:
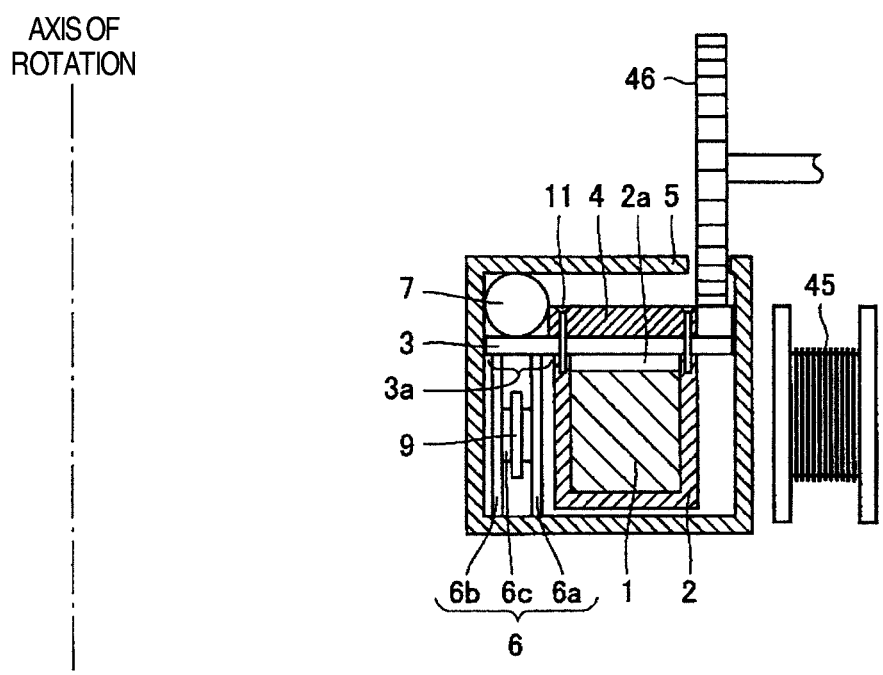
FIG. 33 is a side view for schematically describing a configuration illustrated in FIG. 32.

FIG. 32 is a view illustrating one example in which the energy conversion apparatus according to the embodiment of the present invention is used as a motor (electrical motor). FIG. 33 is a side view for schematically describing the configuration illustrated in FIG. 32. With reference to FIGS. 32 and 33, a plurality of stators 45 are arranged at a predetermined electrical angle at the outside of the magnet holder 2. The predetermined electrical angle is determined in accordance with the arrangement of the plurality of coils 8. As illustrated in FIG. 32, when viewed in two dimensions, one stator 45 is arranged between two coils 8. The stator 45 is configured by a core and a coil wound around the core.

The window part 5a of the case 5 is formed, for example, at an upper part of the case 5 so as not to interfere with the stator 45. The gear 4 is engaged with an external gear 46. When a current polarity of the plurality of stators 45 is switched, the plurality of permanent magnets 1 that are arranged in the magnet holder 2 in a ring shape are rotated.

The current polarity of each of the stators 45 is switched, for example, by a commutator (not illustrated). In this case, the commutator is rotated in conjunction with the magnet holder 2. The commutator may be rotated, for example, in conjunction with the gear 46. Alternatively, a current may be applied to the coils of the stators 45 so as to generate a rotating magnetic field on the plurality of stators 45. Various known technologies are applied and a magnetic field generated on the plurality of stators 45 is subsequently switched. Thereby, the magnet holder 2 in which the plurality of permanent magnets 1 are housed is rotated.

According to the above-described configuration, through the rotation of the magnet holder 2, mechanical energy is taken out from the energy conversion apparatus 100. Further, power is also generated on the plurality of coils 8. Power generated on the plurality of coils 8 is put to practical use for various purposes.

Further, a current the polarity of which is switched may flow through each of the plurality of coils 8 so as to generate the rotating magnetic field on the plurality of coils 8. In this case, the magnetic holder 2 is rotated without depending on the stators 45.

Figure 34:
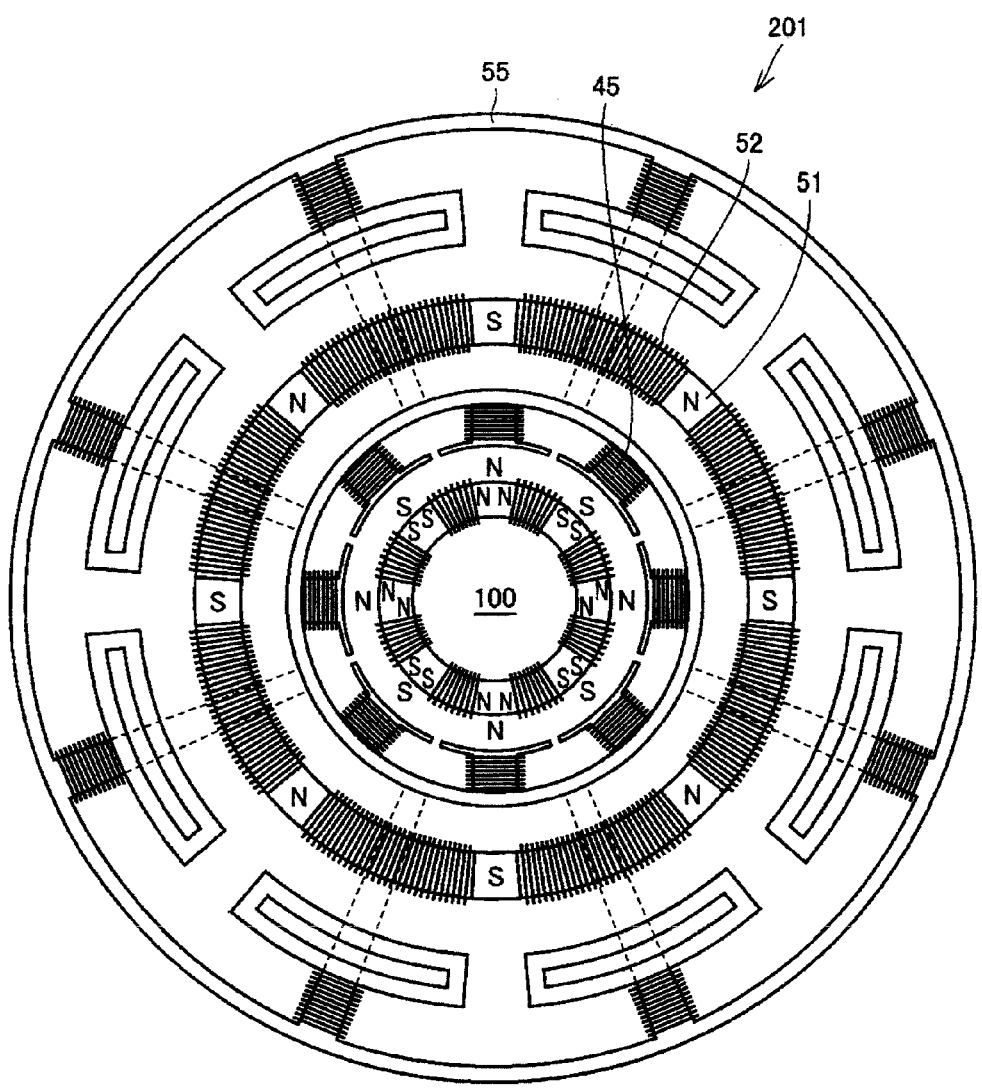
FIG. 34 is a schematic view illustrating another example of the energy conversion apparatus according to the embodiment of the present invention.

FIG. 34 is a schematic view illustrating another example of the energy conversion apparatus according to the embodiment of the present invention. With reference to FIG. 34, in an energy conversion apparatus 201, the stators 45, a magnet ring 51, coils 52, and a stator 55 are added to the energy conversion apparatus 100. The plurality of stators 45 are arranged at the outside of the energy conversion apparatus 100. The magnet ring 51 is arranged so as to surround the plurality of stators 45. The magnet ring 51 is configured by a plurality of permanent magnets that are arranged in a ring shape. The magnet ring 51 is configured, for example, by a magnet holder having the same configuration as that of the magnet holder 2 and a plurality of permanent magnets that are inserted into the magnet holder.

The coil 52 is wound around the magnet ring 51. The stator 55 is arranged at the outside of the magnet ring 51 and the coils 52. A current the polarity of which is switched is allowed to flow through each of the stators 45 and the stator 55 to thereby rotate the internal magnet ring (magnet holder 2 of the energy conversion apparatus 100) and the external magnet ring 51 (added magnet ring). As a result, power is taken out from the energy conversion apparatus 100 (coils 8) and the coils 52 (added coils). Accordingly, the output of the energy conversion apparatus is more increased.

Figure 35:
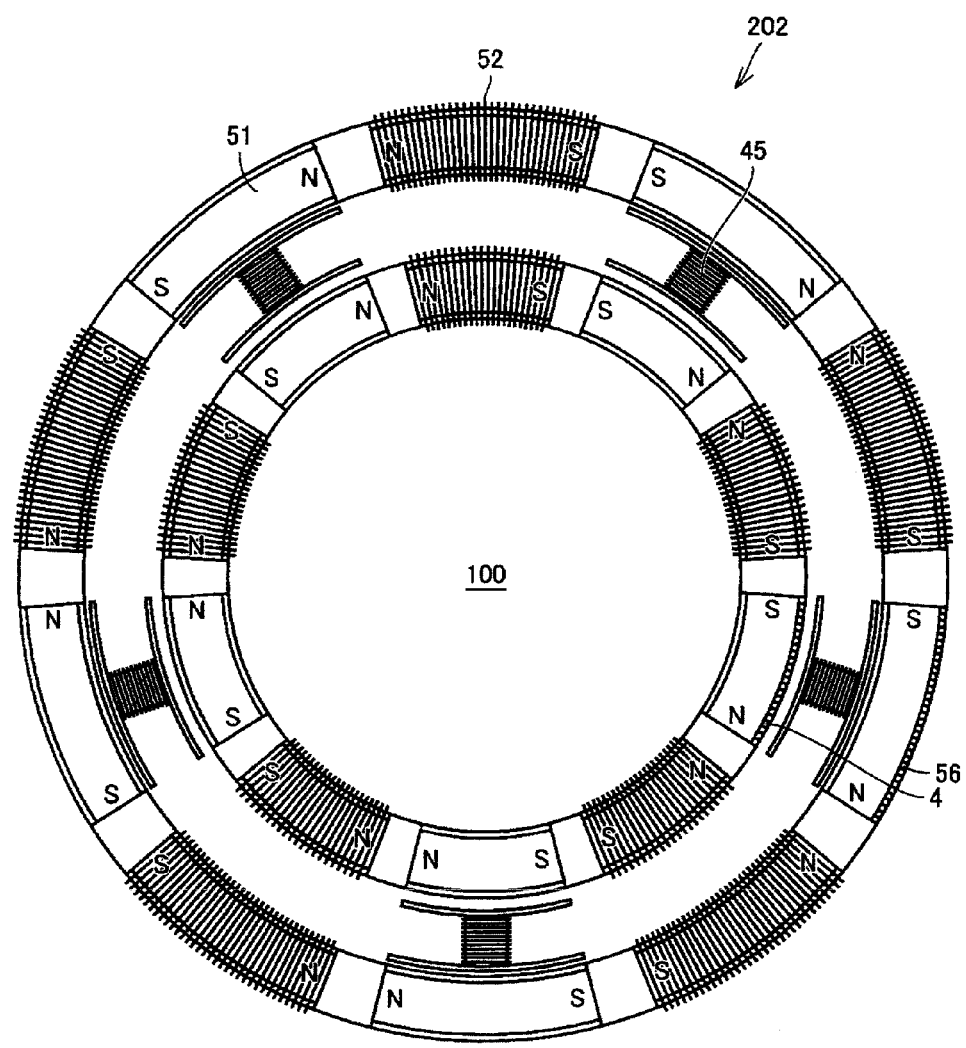
FIG. 35 is a schematic view illustrating yet another example of the energy conversion apparatus according to the embodiment of the present invention.

FIG. 35 is a schematic view illustrating yet another example of the energy conversion apparatus according to the embodiment of the present invention. With reference to FIG. 35, an energy conversion apparatus 202 has a configuration in which the stators 45, the magnet ring 51, and the coils 52 are added to the energy conversion apparatus 100. A gear 56 is formed in the magnet ring 51. The magnet ring 51 is configured, for example, by the same configurations as those of the magnet holder 2, the cover 3, and the gear 4.

The stators 45 are arranged between the energy conversion apparatus 100 and the magnet ring 51. That is, in the configuration of FIG. 35, the stators 45 common to the internal magnet ring (magnet holder 2 of the energy conversion apparatus 100) and the external magnet ring 51 (added magnet ring) are provided.

The number of teeth of the gear 56 of the magnet ring 51 is the same as that of the gear 4 of the energy conversion apparatus 100. The magnet ring 51 is rotated in synchronization with the gear 4, namely, the magnet holder 2 of the energy conversion apparatus 100. For the purpose, for example, a synchronization mechanism to be hereinafter described is used. For preventing the figure from being complicated, in FIG. 35, the gear 4 is illustrated in only part of the energy conversion apparatus 100 and the gear 56 is illustrated in only part of the magnet ring 51. Note that, the configuration of the energy conversion apparatus 100 is as described above, and the gear 4 is formed over the entire periphery of the magnet ring. In a similar fashion, the gear 56 is formed over the entire periphery of the magnet ring 51.

Figure 36:
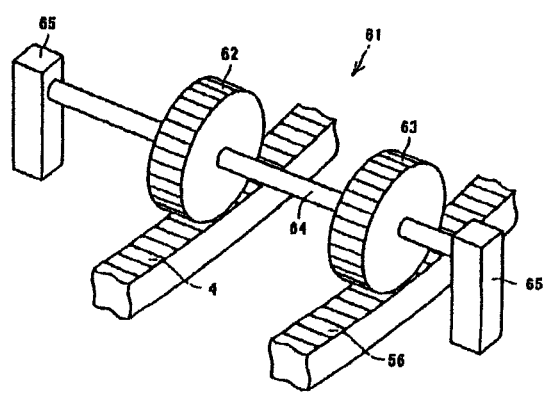
FIG. 36 is a view illustrating a configuration example of a mechanism in which two magnet rings are rotated in synchronization with each other.

FIG. 36 is a view illustrating a configuration example of a mechanism in which two magnet rings are rotated in synchronization with each other. With reference to FIG. 36, a synchronization mechanism 61 includes gears 62 and 63, an axis of rotation 64, and supporting members 65. The gear 62 is engaged with the gear 4 of the energy conversion apparatus 100. The gear 63 is engaged with the gear 56. Note that FIG. 36 illustrates part of the gears 4 and 56. The gears 62 and 63 are connected to the axis of rotation 64. Both ends of the axis of rotation 64 are supported by two supporting members 65, respectively. The number of teeth of the gear 62 and that of the gear 63 are the same as each other.

According to the configuration illustrated in FIGS. 35 and 36, both of the magnet holder of the energy conversion apparatus 100 and the magnet ring 51 are rotated by one stator 45. By rotating the two magnet rings at the same time, power is taken out from the coil 8 of the energy conversion apparatus 100 and the coil 52. Accordingly, the output of the energy conversion apparatus is more increased.

Further, in the configuration illustrated in FIGS. 35 and 36, in place of the energy conversion apparatus 100, the energy conversion apparatus 202 may include the energy conversion apparatus 101 according to the second embodiment. Further, the energy conversion apparatus 202 illustrated in FIG. 35 may be prepared in plurality, and a plurality of the energy conversion apparatus 202 may be mounted in the up-and-down direction (corresponding to perpendicular to a paper surface of FIG. 35). The above-described configuration permits the output to be more obtained.

The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS LIST

1 Permanent magnet
2 Magnet holder
1.1, 1.2 Magnet block
2 Magnet holder
2.1 to 2.8 Part
2a Magnet box
2b Screw hole
2d, 10c Pinhole
2e Concave part
2f, 2h, 2i Convex part
2g Pin
3 Cover
3a, 3b Extension part
4, 41, 46, 56, 62, 63 Gear
5 Case
5a Window part
6, 36 Wheel
6a, 6b, 36a, 36b Circular plate
6c, 23a, 36c, 64 Axis of rotation
7 Rolling element
8, 52 Coil
9, 39 Defining member
9a Through-hole
10 Spool
10b, 11 Screw
12 Circumference
15 Base
16a to 16d, 23b Contact part
21 Bearing
21a Supporter
21b Ball
23 Roller
31 Vessel
32 Spherical magnet
42 Motor
43 Power supply
45, 55 Stator
47 Commutator
51 Magnet ring
61 Synchronization mechanism
65 Supporting member
100, 101, 201, 202 Energy conversion apparatus

The invention claimed is:

1. An energy conversion apparatus for executing conversion from one to another of electrical energy and mechanical energy, comprising:
a magnet ring, a direction of central axis of which is vertical, the magnet ring including:
a ring-shaped magnet holder in which a plurality of magnet boxes an upper part of which is opened is formed;
at least one permanent magnet that is housed in each of the plurality of magnet boxes of the magnet holder, each of the at least one permanent magnet being magnetized along a circumferential direction of the magnet holder;
a cover that is formed in a ring shape having a width wider than that of the magnet holder, and that is attached to an upper surface of the magnet holder so as to have a same center as that of the magnet holder, and that has an extension part extending in a radial direction of the magnet holder from the magnet holder;
a gear that is fixed onto the cover and the magnet holder so as to have a same center as those of the magnet holder and the cover, and
each of an at least one adjacent permanent magnet is arranged in such a manner that both of same polarities face each other in a corresponding magnet holder of the magnet holder, in case that a number of the at least one permanent magnet is plural,
the energy conversion apparatus further comprising:
a ring-shaped case, a central axis of which is common with the central axis of the magnet ring, that houses the magnet ring and in which a window part for exposing part of the gear to an outside is formed;
a plurality of wheels that are arranged between an internal surface of the case and the magnet holder so as to be contacted with a bottom surface of the case and the extension part of the cover;
a defining member through which each axis of rotation of the plurality of wheels is passed and that defines a relative distance between the plurality of wheels; and
at least one coil that is wound around the case.

2. The energy conversion apparatus according to claim 1, wherein each of the plurality of wheels includes at least two circular plates that are connected through the axis of rotation.

3. The energy conversion apparatus according to claim 1, further comprising a rolling element that is arranged between an internal surface of the case and at least one of the cover and the magnet holder.

4. The energy conversion apparatus according to claim 3, wherein
an internal radius of the gear is larger than that of the case, and
the rolling element is arranged between the gear and the internal surface of the case.

5. The energy conversion apparatus according to claim 1, further comprising:
a vessel that is provided over the case; and
a spherical magnet that is housed in the vessel so as to be freely rotated in the vessel according to a repelling force or an attracting force with each of the plurality of permanent magnets, the spherical magnet including both one hemispherical part magnetized in N-pole and another hemispherical part magnetized in S-pole.

6. The energy conversion apparatus according to claim 1, wherein
a cross section of the magnet holder along a radial direction of the magnet holder is approximately rectangular,
a cross section of the case along a radial direction of the case is approximately rectangular, and
a cross section of the coil along a radial direction of the coil is approximately rectangular.

7. The energy conversion apparatus according to claim 1, wherein
the energy conversion apparatus is a generator, and
the gear is engaged with a gear of a source of power.

8. The energy conversion apparatus according to claim 1, wherein
the energy conversion apparatus is a motor, and
the motor further includes a stator that is arranged facing the case.

9. The energy conversion apparatus according to claim 8, wherein
the stator is provided outside the case,
the energy conversion apparatus further comprising:
an added magnet ring that is provided outside the stator and that includes a plurality of permanent magnets arranged in a ring shape,
an added coil through which the added magnet ring is passed, and
an added stator that is arranged outside the added magnet ring.

10. The energy conversion apparatus according to claim 8, wherein
the stator is provided outside the case,
the energy conversion apparatus further comprising:
an added magnet ring that is provided outside the stator, and in which a gear having same number of teeth as that of the gear is formed, and that includes a plurality of permanent magnets arranged in a ring shape;
an added coil through which the added magnet ring is passed; and
a synchronization mechanism for mutually synchronizing rotations of the magnet ring and the added magnet ring, the synchronization mechanism including:
a first gear that is engaged with the gear;
a second gear that is engaged with the first gear; and
an axis of rotation that connects the first and second gears, wherein
the number of teeth of the first gear and the number of teeth of the second gear, are equal to each other.

* * * * *